(12) United States Patent
Strashny

(10) Patent No.: US 12,240,355 B2
(45) Date of Patent: Mar. 4, 2025

(54) SYSTEM AND METHOD FOR SUPPORTING ELEVATED POWER RAILS

(71) Applicant: Caterpillar Global Mining Equipment LLC, Denison, TX (US)

(72) Inventor: Igor Strashny, Tucson, AZ (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 691 days.

(21) Appl. No.: 17/563,339

(22) Filed: Dec. 28, 2021

(65) Prior Publication Data

US 2023/0202306 A1 Jun. 29, 2023

(51) Int. Cl.
*B60M 1/30* (2006.01)
*B60L 9/00* (2019.01)
*B60M 7/00* (2006.01)

(52) U.S. Cl.
CPC ............. *B60M 1/307* (2013.01); *B60L 9/00* (2013.01); *B60M 1/30* (2013.01); *B60M 1/302* (2013.01); *B60M 7/00* (2013.01); *B60L 2200/40* (2013.01)

(58) Field of Classification Search
CPC ........ B60M 1/30; B60M 1/307; B60M 1/302; B60M 7/00; B60L 5/38; B60L 2200/26; B60L 2200/40; B60L 5/36; B60L 9/00
See application file for complete search history.

(56) References Cited

U.S. PATENT DOCUMENTS

| | | | | |
|---|---|---|---|---|
| 3,786,762 A | * | 1/1974 | Corkum .................. | B60M 1/30 191/29 R |
| 4,043,436 A | * | 8/1977 | Segar ...................... | B60M 1/34 191/23 R |
| 4,049,092 A | * | 9/1977 | Lillard .................... | B60L 5/40 191/40 |
| 4,246,987 A | * | 1/1981 | McMordie .............. | B60M 1/30 191/32 |

(Continued)

FOREIGN PATENT DOCUMENTS

| | | |
|---|---|---|
| CN | 202623959 U | 12/2012 |
| CN | 207257430 U | 4/2018 |

(Continued)

OTHER PUBLICATIONS

Written Opinion and International Search Report for Int'l. Patent Appln. No. PCT/US2022/051790, mailed Apr. 20, 2023 (12 pgs).

(Continued)

*Primary Examiner* — Zachary L Kuhfuss
*Assistant Examiner* — Cheng Lin

(57) ABSTRACT

A modular structure supports elevated rail segments for delivering electrical power to a moving work machine, such as a hauler at a mining site. Opposite ends of a roadside barrier contain complementary tubular couplers arranged vertically. A lower end of a dielectric post positioned in one of the tubular couplers has opposing dielectric plates at an upper end. A top edge of each plate has a creepage concavity between a pair of rail recesses. Another dielectric post of similar configuration is positioned in the other of the tubular (Continued)

couplers. Holes within the couplers and the posts ensure alignment of respective rail recesses in which conductive rails are placed. Dielectric inserts frictionally lock the rails into the rail recesses.

20 Claims, 14 Drawing Sheets

(56) References Cited

U.S. PATENT DOCUMENTS

| | | | |
|---|---|---|---|
| 4,681,302 A | 7/1987 | Thompson | |
| 6,848,857 B1* | 2/2005 | McColl | E01F 15/088 404/6 |
| 7,926,634 B1* | 4/2011 | Morales | B60M 1/307 191/32 |
| 8,152,408 B1 | 4/2012 | Tullis et al. | |
| 8,556,189 B2* | 10/2013 | Zhou | B60M 1/305 238/14.6 |
| 2004/0168873 A1* | 9/2004 | Nunlist | B60M 1/305 191/22 R |
| 2014/0027603 A1 | 1/2014 | Mccoy | |
| 2015/0037991 A1 | 2/2015 | Bonzi et al. | |
| 2017/0166084 A1* | 6/2017 | Tajima | B60L 53/35 |
| 2023/0202348 A1* | 6/2023 | Strashny | B60M 1/302 104/2 |
| 2023/0203761 A1* | 6/2023 | Strashny | E01F 15/083 104/2 |

FOREIGN PATENT DOCUMENTS

| | | |
|---|---|---|
| EP | 1164222 A1 | 12/2001 |
| EP | 2284635 A1 | 2/2011 |
| EP | 3091655 A1 | 11/2016 |
| JP | 05035454 | 5/1993 |
| JP | 5864173 B2 | 4/2013 |
| JP | 6138425 B2 | 11/2013 |
| KR | 20100114310 A | 10/2010 |
| KR | 20130001809 A | 1/2013 |
| KR | 101689115 B1 | 12/2016 |
| KR | 20170118281 A | 10/2017 |
| KR | 102094970 B1 * | 12/2017 |
| WO | WO-2020186296 A1 * | 9/2020 |

OTHER PUBLICATIONS

Written Opinion and International Search Report for Int'l. Patent Appln. No. PCT/US2022/080990, mailed Apr. 20, 2023 (9 pgs).
Written Opinion and International Search Report for Int'l. Patent Appln. No. PCT/US2022/051796 mailed Dec. 5, 2023 (11 pgs).

* cited by examiner

SYSTEM AND METHOD FOR SUPPORTING ELEVATED POWER RAILS

TECHNICAL FIELD

The present disclosure relates to a system and method for supporting exposed rails at a position elevated above ground. More specifically, the present disclosure relates to an assembly including recessed plates and posts mounted within barriers of a modular support structure for positioning segments of electrical rails for powering a moving vehicle.

BACKGROUND

Heavy work machines, such as earth-moving vehicles or hauling trucks, require significant power to carry out their functions. The machines themselves can be of substantial weight, and their loads require large amounts of power to move. Diesel engines typically provide that power, but they can have disadvantages. For instance, in some implementations, heavy work machines may need to travel large distances through rugged terrain. At a remote mining site, for example, groups of these machines are often employed to ferry extreme loads along roadways, or haul routes, extending between various locations within the mining site. Supplies of diesel fuel may be far away from such locations or not easily delivered to such locations. In addition, the groups of diesel machines can generate significant pollution.

A power rail based on the ground may provide electrical power to traveling vehicles such as heavy work machines. In some environments, such as with trains or subways that travel on a fixed track, precise alignment between the fixed track and the power rail can ensure reliable delivery of electrical power as the vehicle moves. For a heavy work machine that is freely steerable, however, establishing and maintaining an electrical connection with a power rail can be challenging. The terrain in some environments, such as a mining site, may be uneven, hilly, and pocked, which can lead to steering deviations that can interfere with continuous connection with power rails along a haul route. Moreover, power rails near the ground, as with trains and subways, can pose safety risks to personnel and be subjected to debris from the travel path in dirty environments.

One approach for providing electrical power to a work machine while traveling on a roadway is described in International Patent App. Pub. No. WO 2020/186296A1 ("the '296 application"). The '296 application describes an electrical delivery system at a mine site for a moving vehicle where two or more conductors are anchored on the side of relocatable roadside barriers. In one embodiment in the '296 application, the conductors are embedded within a horizontal channel having a V-shaped entrance formed in a body of electrically insulating material, and flexible attachments connect the body to the side of the roadside barrier or a pole. As a result, the delivery system of the '296 application requires precise movement from a retractable arm on a vehicle to engage the embedded conductors with the horizontal channel. In addition, the delivery system of the '296 application does not contemplate safety concerns with mounting conductors within reach at a roadside barrier or replaceability of conductors in the installed system. As a result, the delivery system of the '296 application is not desirable for mounting power rails in a modular support structure along a haul route for powering heavy work machines being steered over diverse terrain or near personnel or wildlife.

Examples of the present disclosure are directed to overcoming deficiencies of such systems.

SUMMARY

In an aspect of the present disclosure, a support structure for conductor rails includes a dielectric post extending along a longitudinal axis from a lower region to an upper region and a first dielectric plate having a first top portion disposed substantially perpendicular to the longitudinal axis, and a substantially planar front surface. The first top portion has a first concave surface, a first rail recess, and a second rail recess, while the first concave surface is disposed between the first rail recess and the second rail recess. The support structure further includes a second dielectric plate having a second top portion disposed substantially perpendicular to the longitudinal axis and a substantially planar rear surface. The second top portion has a second concave surface, a third rail recess, and a fourth rail recess, while the second concave surface is disposed between the third rail recess and the fourth rail recess. The first dielectric plate and the second dielectric plate are connected to the dielectric post such that the front surface is disposed opposite and facing the rear surface and is spaced from the rear surface by a first distance.

In another aspect of the present disclosure, an apparatus includes an oblong base having a first end separated from a second end along a horizontal axis, a first rail support positioned at the first end of the oblong base along a first substantially vertical axis and a second rail support positioned at the second end of the oblong base along a second substantially vertical axis. The first rail support includes a first dielectric post and a first dielectric plate, the first dielectric plate having a first top portion with a first concave surface between a first rail recess and a second rail recess. The second rail support includes a second dielectric post and a second dielectric plate, the second dielectric plate having a second top portion with a second concave surface between a third rail recess and a fourth rail recess. A first conductor rail is situated within the first rail recess and the third rail recess, and a second conductor rail is situated within the second rail recess and the fourth rail recess.

In yet another aspect of the present disclosure, a method includes placing a moveable support structure on a ground surface, the moveable support structure having a first end and a second end separated along a horizontal axis by a base and inserting a lower portion of a first dielectric post into a first holder connected to the first end. The first dielectric post has an upper portion supporting first substantially parallel dielectric plates on opposite sides of the first dielectric post. The method includes inserting a lower portion of a second dielectric post into a second holder connected to the second end, where the second dielectric post has an upper portion supporting second substantially parallel dielectric plates on opposite sides of the second dielectric post. The lower portion of the first dielectric post is arranged in the first holder and the lower portion of the second dielectric post is arranged in the second holder to position a first pair of rail recesses on the first parallel dielectric plates and a second pair of rail recesses on the second parallel dielectric plates for receiving a first conductive rail. The method includes securing the lower portion of the first dielectric post to the first holder and securing the lower portion of the second dielectric post to the second holder.

DETAILED DESCRIPTION

Figure 1:
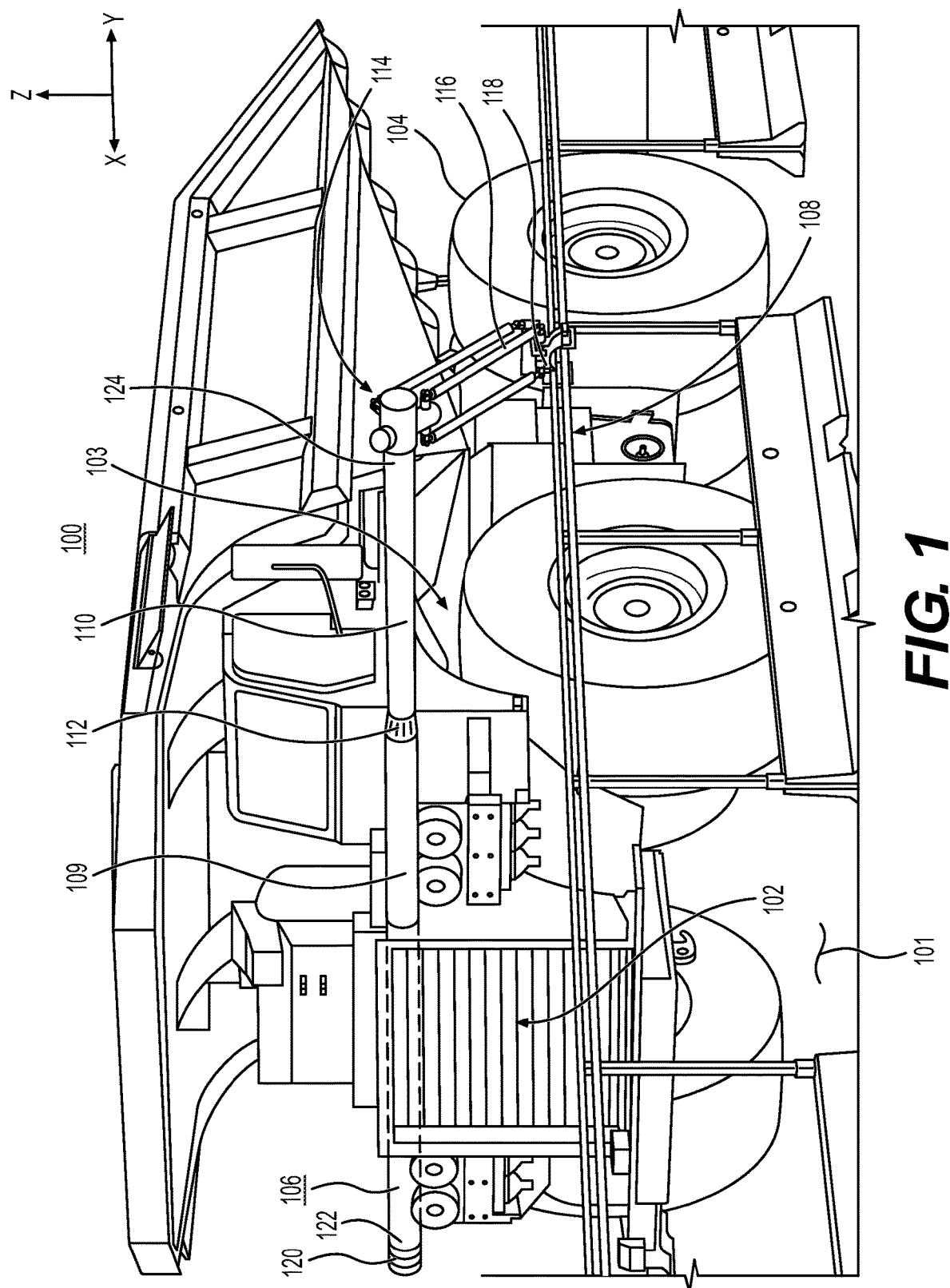
FIG. 1 is an isometric view of an electrically powered work machine coupled to a roadside power source in accordance with an example of the present disclosure.

Wherever possible, the same reference numbers will be used throughout the drawings to refer to same or like parts. Multiple instances of like parts within a figure may be distinguished using a letter suffix. FIG. 1 illustrates an isometric view of a work machine 100 within an XYZ coordinate system as one example suitable for carrying out the principles discussed in the present disclosure. Exemplary work machine 100 travels parallel to the X axis along a roadway, also termed a haul route 101, typically from a source to a destination within a worksite. In one implementation as illustrated, work machine 100 is a hauling machine that hauls a load within or from a worksite within a mining operation. For instance, work machine 100 may haul excavated ore or other earthen materials from an excavation area along haul route 101 to dump sites and then return to the excavation area. In this arrangement, work machine 100 may be one of many similar machines configured to ferry earthen material in a trolley arrangement. While a large mining truck in this instance, work machine 100 may be any machine that carries a load between different locations within a worksite, examples of which include an articulated truck, an off-highway truck, an on-highway dump truck, a wheel tractor scraper, or any other similar machine. Alternatively, work machine 100 may be an off-highway truck, an on-highway truck, a dump truck, an articulated truck, a loader, an excavator, a pipe layer, or a motor grader. In other implementations, work machine 100 need not haul a load and may be any machine associated with various industrial applications including, but not limited to, mining, agriculture, forestry, construction, and other industrial applications.

Referring to FIG. 1, an example work machine 100 includes a frame 103 powered by electric engine 102 to cause rotation of traction devices 104. Traction devices 104 are typically four or more wheels with tires, although tracks or other mechanisms for engagement with the ground along haul route 101 are possible. Electric engine 102 functions to provide mechanical energy to work machine 100 based on an external electrical power source, such as described in further detail below. An example of mechanical energy provided by electric engine 102 includes propelling traction devices 104 to cause movement of work machine 100 along haul route 101, but electric engine 102 also includes components sufficient to power other affiliated operations within work machine 100. For instance, in some implementations, electric engine 102 includes equipment for converting electrical energy to provide pneumatic or hydraulic actions within work machine 100. While electric engine 102 is configured to operate from an external electrical power source, electric engine 102 typically includes one or more batteries for storing electrical energy for auxiliary or backup operations.

In accordance with the principles of the present disclosure, work machine 100 further includes a conductor rod 106 configured to receive electrical power from a power rail 108. In some examples, power rail 108 is one or more beams of metal arranged substantially parallel to and at a distance above the ground. In FIG. 1, power rail 108 is positioned to be substantially parallel to the X axis and the direction of travel of work machine 100. Support mechanisms hold power rail 108 in place along a distance at the side of haul route 101 for work machine 100 to traverse. The support mechanisms and power rail 108 may be modular in construction, enabling their disassembly and reassembly at different locations or their repositioning along the existing haul route 101. In many examples, such as within a mining site, power rail 108 will not be configured continuously at a fixed distance along a side of haul route 101 and at a fixed height above the ground due, at least in part, to the variation of the terrain. Therefore, it is expected that the vertical, horizontal, and angular positions of the surface of power rail 108 in the XYZ planes will vary along haul route 101. Moreover, while shown in FIG. 1 to the left of work machine 100 as work machine 100 travels in the direction of the X axis, power rail 108 may be installed to the right of work machine 100 or in other locations suitable to the particular implementation.

Power rail 108 provides a source of electrical power for work machine 100 as either AC or DC. In some examples, power rail 108 has two or more conductors, each providing voltage and current at a different electrical pole. In one implementation (e.g., an implementation in which the power rail 108 includes three conductors), one conductor provides positive DC voltage, a second conductor provides negative DC voltage, and a third conductor provides 0 volts relative to the other two conductors. The two powered conductors within power rail 108 provide +1500 VDC and 1500 VDC. These values are exemplary, and other physical and electrical configurations for power rail 108 are available and within the knowledge of those of ordinary skill in the art.

Conductor rod 106 enables electrical connection between work machine 100 and power rail 108, including during movement of work machine 100 along haul route 101. In the example shown in FIG. 1, conductor rod 106 is an elongated arm resembling a pole. FIG. 1 shows conductor rod 106 positioned along a front side of work machine 100, with respect to the direction of travel of work machine 100 in the direction of the X axis. In this arrangement, conductor rod 106 is located in FIG. 1 in the Y-Z plane essentially along the Y axis with a first end near a right side of work machine 100 and a second end at a left side of work machine 100. Conductor rod 106 may be attached to any convenient location within work machine 100, such as to frame 103, in a manner to couple conductor rod 106 to power rail 108. Shown in FIG. 1 as extending to a left side of work machine 100 toward power rail 108, conductor rod 106 may alternatively be arranged to extend to a right side and at any desired angle from work machine 100 such that conductor rod 106 may be coupled to power rail 108 for obtaining electrical power.

As embodied in FIG. 1, conductor rod 106 includes a barrel 109 mounted to frame 103 of work machine 100. Barrel 109 has a hollow interior and may be a conductive metal having suitable mechanical strength and resiliency, such as aluminum. Within barrel 109, an arm 110 is retained. Arm 110 is slidably engaged within conductor rod 106 such that it may be extended or retracted axially, i.e., along the Y axis in FIG. 1, to adjust the reach of conductor rod 106. Specifically, in a retracted position, arm 110 is caused to slide within barrel 109 of conductor rod 106 such that a length of conductor rod 106 roughly spans the width of work machine 100. A junction 112 serves as the interface between arm 110 and barrel 109, which is the main body of conductor rod 106. When arm 110 is fully retracted or collapsed into barrel 109, junction 112 essentially becomes the left edge of conductor rod 106. On the other hand, when arm 110 is extended from barrel 109 of conductor rod 106, arm 110 may reach from work machine 100 to proximate power rail 108 on the side of haul route 101.

Within, and possibly including barrel 109, conductor rod 106 includes a series of electrical conductors passing longitudinally, at least from a head 122 at a proximal end to a tip 124 at a distal end. Typically, the conductors within conductor rod 106 are formed of a metallic material and are rigid. In some examples, the conductors are concentric tubes, or hollow cylinders, of solid metal such as aluminum nested together and sized to provide electrical capacity sufficient for powering work machine 100. Tubular conductors within arm 110 slidably engage with corresponding tubular conductors within barrel 109 to maintain electrical continuity as arm 110 is extended or retracted.

At a position away from work machine 100 at tip 124, a connector assembly 114 provides an interface to power rail 108 via trailing arms 116 and contactor 118. Power rail 108 is typically arranged along a side of haul route 101, and work machine 100 is steered so that it traverses haul route 101 substantially in parallel with power rail 108. Thus, in reference to FIG. 1, power rail 108 and a travel path for work machine 100 are substantially in parallel with each other, and with the X axis. Contactor 118 is configured to maintain an electrical connection with power rail 108 while sliding along its surface in the direction of the X axis as work machine 100 moves. In some examples, trailing arms 116 are conductors coupled to contactor 118, each conducting voltage and current at a different electrical pole and corresponding to the conductors within conductor rod 106. In operation, electrical power is accessed from power rail 108 via contactor 118, which remain in contact during movement of work machine 100, and the electrical power is conducted through trailing arms 116 into connector assembly 114.

From connector assembly 114, the electrical power is conveyed at tip 124 through the nested tubular conductors within arm 110 and barrel 109 to head 122 of conductor rod 106 and through a head-end interface 120 to work machine 100. Head-end interface 120 provides at least an electrical connection between conductor rod 106 and work machine 100 for powering electric engine 102 and otherwise enabling operations within work machine 100. In some examples, head-end interface 120 may also provide an interface for inputs to control mechanical operation of conductor rod 106, such as passageways for pressurized air of a pneumatic control system to extend and retract arm 110 or signaling for electronic controls.

Figure 2:
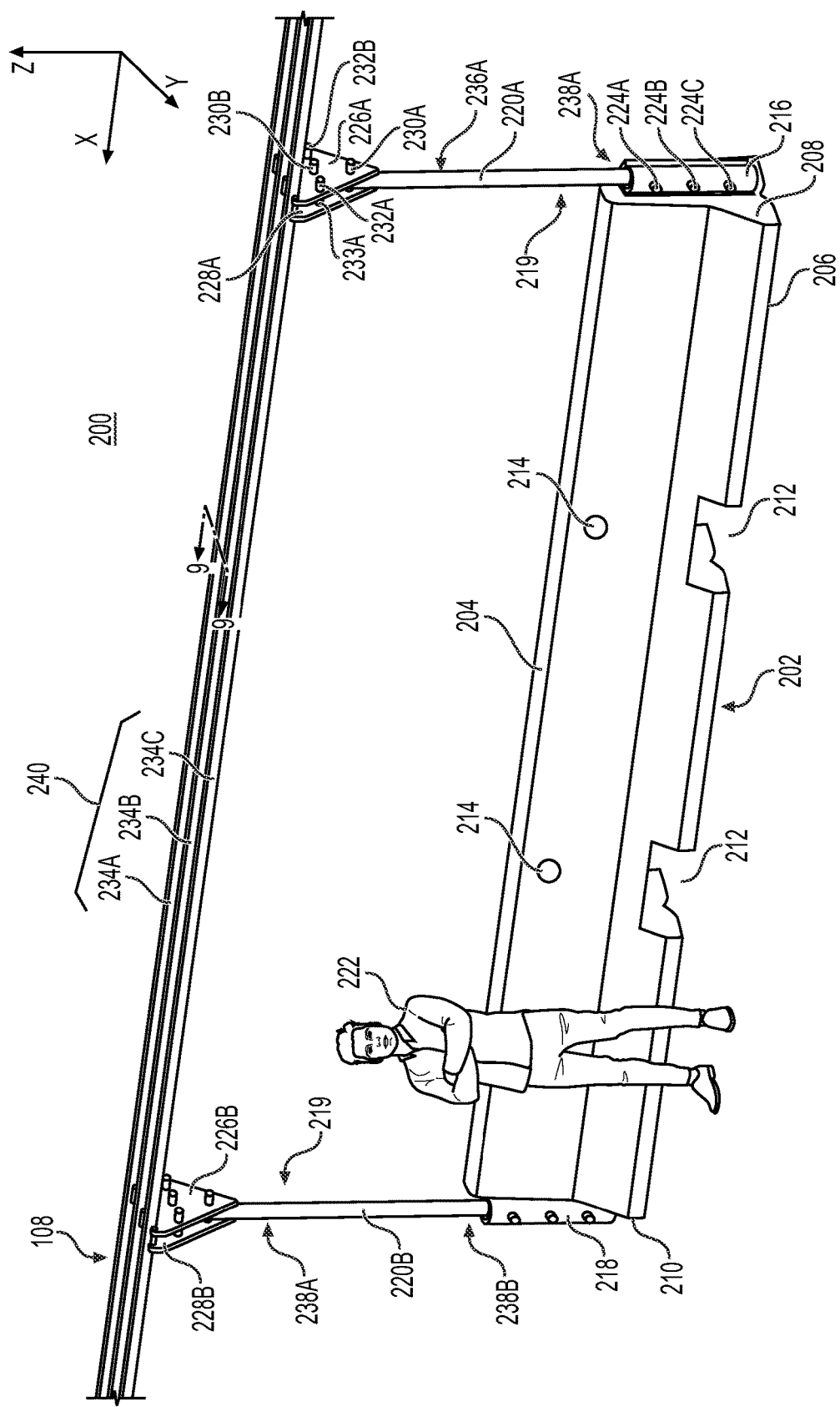
FIG. 2 is an isometric view of rail support module with power rails in accordance with an example of the present disclosure.

While FIG. 1 illustrates a general arrangement for work machine 100 to access electrical power from power rail 108 while moving, the reliability of a connection between contactor 118 and power rail 108 can be influenced by stable positioning for power rail 108 along the side of haul route 101. In some examples, power rail 108 is kept at a relatively constant distance from a side of haul route 101 and height above the ground along haul route 101 to minimize risk of disconnection. Moreover, the positioning of power rail 108 along haul route 101 should be generally impervious to external factors such as rain or wind, as changes in positioning can affect the connection between contactor 118 and power rail 108. FIG. 2 depicts an exemplary arrangement for stably and safely supporting power rail 108 along a side of haul route 101.

Compared with FIG. 1, FIG. 2 provides a view of rail support module 200 from the same side of power rail 108, but at an angle looking slightly in the direction of forward travel for work machine 100 along haul route 101 (i.e., in the direction of the X axis). As generally embodied in FIG. 2, rail support module 200 is an example of one instance in a series of support assemblies implemented together for securely positioning power rail 108 along a side of haul route 101. When implemented for an overall transportation route, such as within a mining site, barrier assembly 202 would be one component within a series or chain of structures providing mechanical stability to power rail 108 along a path for conduction of electrical power. FIGS. 3-6, discussed below, provide detail regarding the use of multiple ones of rail support module 200 in a series along a path for electrical power along haul route 101.

In general, rail support module 200 for power rail 108 includes a barrier assembly 202, which includes a barrier 204, a closed coupler 216, and open coupler 218. As illustrated, barrier 204 is a roadside barrier, such as a so-called "Jersey barrier," commonly used in highway construction. barrier 204, however, may be any form of moveable, yet stable support structure typically of a substantially oblong shape. In the illustrated example, barrier 204 includes and/or rests on a base 206 at its bottom that extends between a first end 208 and a second end 210. The oblong or rectangular shape can help barrier 204 stabilize power rail 108 across a longitudinal distance parallel to base 206. In the illustrated example, barrier 204 is approximately 20 feet in length along base 206 and two feet in width across base 206 at first end 208 and at second end 210. These dimensions, as well as others provided in this disclosure, are representative only. Other values are readily usable for achieving similar results.

In one example, barrier 204 is made primarily of concrete with reinforcing steel bars (not shown) set within the concrete to enhance solidity of barrier 204. In other examples, barrier 204 is a different composition, such as a plastic filled with weighted material, or a different shape. Various compositions and shapes for barrier 204 may be employed without departing from the principles of the present disclosure. In an example of concrete, barrier 204 weighs about 8,000 pounds. With this substantial weight, which helps deter unintended movement after placement, barrier 204 includes base gap 212 for lifting and placement by a forklift or similar machine. In addition, barrier 204 has at least one strap hole 214, which may be used for feeding a strap or similar implement to assist in lifting and placing barrier 204. Additionally, the shape of barrier 204 enables use of commercially available barrier clamp tools, which may grip barrier 204 through a scissor action for machine lifting without need for base gap 212 or strap hole 214. Therefore, barrier 204 is modular, moveable, and relocatable, yet also stable if impacted by most outside forces such as from movement of power rail 108 or haul route 101 or from weather.

Barrier assembly 202 further includes closed coupler 216 attached to first end 208 and open coupler 218 attached to second end 210. Discussed in detail below with respect to FIGS. 3-5, closed coupler 216 and open coupler 218 in some examples have generally tubular configurations in which closed coupler 216 has an outer diameter smaller than an inner diameter of the open coupler 218, and can fit concentrically within open coupler 218. In addition, as shown in FIG. 2, the structure for closed coupler 216 and open coupler 218 enable the insertion and retention of support assembly 219 via support posts within the tubular configurations. Described further below, support assembly 219 includes a variety of components such as posts and plates for supporting power rail 108 at an elevated position above ground from barrier assembly 202. In the illustrated example, support assembly 219 includes first support pole 220A mounted via first lower portion 238A and secured within closed coupler 216, and second support pole 220B mounted via second lower portion 238B and secured within open coupler 218. Specifically, first coupler pin 224A, second coupler pin 224B, and third coupler pin 224C are made of a pultruded fiberglass-reinforced polymer (FRP) and inserted within horizontal holes (see FIG. 3) to secure first support pole 220A in place within closed coupler 216 as part of barrier assembly 202. Other electrically insulative or dielectric materials may alternatively be used. Although not shown in FIG. 2, similar attachments may exist between second support pole 220B and open coupler 218.

First support pole 220A and second support pole 220B, as part of support assembly 219 and rail support module 200, are rods, poles, posts, cylinders, stanchions, or similar structures made of dielectric material and having a length for elevating and supporting power rail 108 above ground. In some examples, first support pole 220A and second support pole 220B are pipes made of a pultruded FRP, or similar dielectric or electrically insulative materials, having lengths sufficient to stabilize power rail 108 about eight feet off the ground. Person 222 in FIG. 2 depicts a relative height of power rail 108 enabled by first support pole 220A and second support pole 220B. By elevating power rail 108 above the typical reach of person 222, first support pole 220A and second support pole 220B help improve safety for the delivery of electrical power for work machine 100. Although power rail 108 may be electrically isolated in a manner to avoid risks of electrocution, the height of power rail 108 also precludes individuals such as person 222 from easily touching power rail 108 while grounded. In addition, the elevated position minimizes the risk of contamination by ground debris or contact from animals or unauthorized individuals on the ground.

At first upper portion 236A of first support pole 220A, a first front plate 226A and a first rear plate 228A within support assembly 219 provide a bracketing structure for holding power rail 108 in place at a position vertically above first end 208. A second front plate 226B and a second rear plate 228B provide a similar structure and function for power rail 108 at second upper portion 236B of second support pole 220B vertically above second end 210. In one example, first front plate 226A, first rear plate 228A, second front plate 226B, and second rear plate 228B are made of pultruded FRP and may be secured respectively to first support pole 220A and second support pole 220B using additional lock pins, such as first plate pin 230A and second plate pin 230B shown in FIG. 2. Additionally, as first front plate 226A and first rear plate 228A face each other on opposite sides of first support pole 220A, in some examples, first lateral pin 232A and second lateral pin 232B pass between first front plate 226A and first rear plate 228A to provide lateral stability and lock the two plates parallel to each other. First lateral pin 232A and second lateral pin 232B pass through fiberglass 233 that can provide a separation or buffer between first front plate 226A and first rear plate 228A. Alternative securing mechanisms are within the principles of the present disclosure and known to those of ordinary skill in the field. The bracketing structure, such as formed by first front plate 226A and first rear plate 228A, is discussed in more detail below with respect to FIGS. 7 and 8.

These various components of support assembly 219 function together to hold power rail 108 from below in a position longitudinally along a path between first support pole 220A and second support pole 220B formed by base 206 of barrier 204. In some examples, such as in a mining site, power rail 108 can extend along haul route 101 for miles. Accordingly, in the example of FIG. 2, power rail 108 is divided into a series of segments associated with a barrier, such as inner rail segment 234A, middle rail segment 234B, and outer rail segment 234C. Although three rail segments are shown and discussed, fewer or more rails are possible. In the example illustrated, inner rail segment 234A, middle rail segment 234B, and outer rail segment 234C are each 41 feet long. Therefore, with an exemplary barrier 204 having a length of 20 feet, about 25% of each of inner rail segment 234A, middle rail segment 234B, and outer rail segment 234C extends beyond first support pole 220A and second support pole 220B. These dimensions and ratios are representative only and other lengths are possible for different implementations in achieving similar results. The combination of rail support module 200, inner rail segment 234A, middle rail segment 234B, and outer rail segment 234C forms a modular unit that can be replicated along haul route 101 to form a collective support structure and continuous path for electrical power. In one example, multiple rail segments such as inner rail segment 234A, middle rail segment 234B, and outer rail segment 234C are connected end-to-end to form power rail 108 in a manner discussed below in the context of FIGS. 9 and 10.

Figure 3:
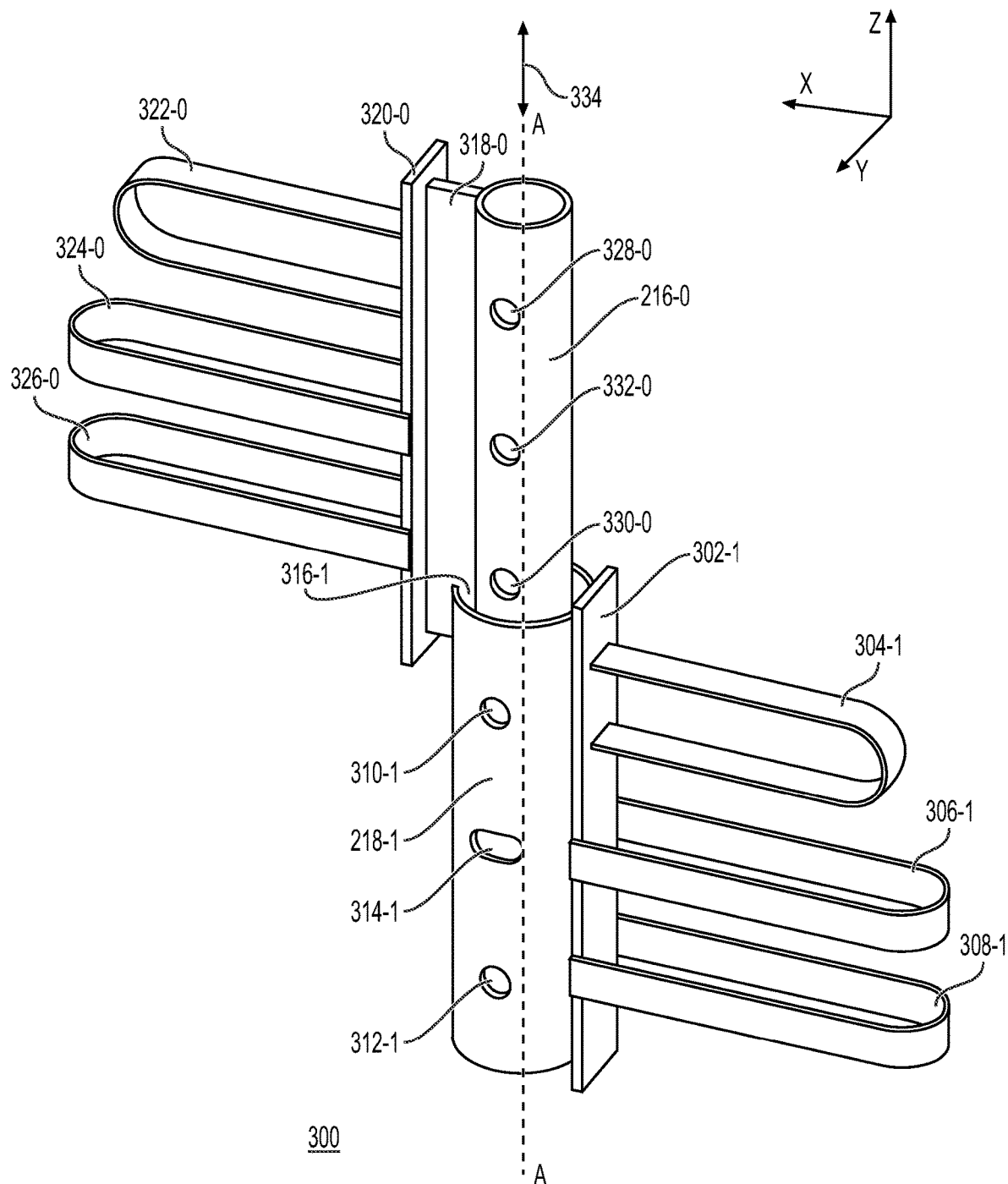
FIG. 3 is an isometric view of an engagement of an open coupler and a closed coupler between barrier assemblies in accordance with an example of the present disclosure.

Combining multiple ones of rail support module 200 in a chain along haul route 101 can be accomplished in many ways. In one example, different ones of barrier 204 can be positioned end-to-end, i.e., longitudinally in a line, and loosely connected via couplers at the ends of the barriers. FIG. 3 illustrates an example of an association between two representative couplers, designated as closed coupler 216-0 and open coupler 218-1. In FIG. 3 and other drawings, the suffix "-n" designates an association of a part with a barrier or support assembly represented by the suffix. Closed coupler 216-0 refers to a closed coupler 216 associated with a barrier "–0," while closed coupler 216-1 refers to a closed coupler 216 associated with a different barrier "–1." As discussed in more detail below with respect to FIG. 6, in some examples, the barrier having suffix "–0" can be a barrier or similar alignment structure used for deploying other barriers 204 in the system but not necessarily used as part of the installed structure supporting power rail 108 along haul route 101.

Positioning multiple barriers in a chain can entail, for example, linking multiple ones of barrier assembly 202 together along haul route 101. FIG. 3 depicts an engagement 300 of two couplers, closed coupler 216-0 and open coupler 218-1, from associated barriers positioned end-to-end. Closed coupler 216-0 and open coupler 218-1 are depicted without their corresponding barriers, barrier 204-0 and barrier 204-1, to which they are attached during deployment. As illustrated in FIG. 3, open coupler 218-1 would reside on a left side of barrier 204-1 (not shown), and closed coupler 216-0 would reside on a right side of barrier 204-0 (not shown).

Open coupler 218-1 generally has a shape of a tube or a hollow cylinder formed about an axis A-A that runs parallel in FIG. 3 to the Z-axis and orthogonal to base 206. Open coupler 218-1 may be made of any structurally resilient material, such as steel or other metals. On one side, the tubular shape of open coupler 218-1 is attached to a first end plate 302-1. First end plate 302-1 in some examples is a metal, such as steel, and abuts first end 208-1 (not shown) on barrier 204-1 opposite to open coupler 218-1. First end plate 302-1 is integrally formed with one or more reinforcement bars that pass within the body of barrier 204-1, namely, first reinforcement 304-1, second reinforcement 306-1, and third reinforcement 308-1, and provide structural support for open coupler 218-1. Open coupler 218-1 also includes top hole 310-1 and bottom hole 312-1 positioned vertically along the A-A axis in one implementation. Similarly, alignment hole 314-1 is positioned vertically along the A-A axis and may have an oval or oblong shape for reasons discussed below. Moreover, while open coupler 218-1 is substantially tubular in shape, in some examples, the tube includes a central slot 316-1 that runs vertically in parallel to the axis A-A giving it an open configuration. In this context, "substantially" means that the shape of open coupler 218-1 generally approximates a hollow cylinder, although it may have a cross section that is out of round, such as being an oval, or have various indentations. Central slot 316-1 can be viewed as a gap between parallel edges of open coupler 218-1 (FIG. 5) or as an open seam within the tubular form of open coupler 218-1.

Corresponding to open coupler 218-1, closed coupler 216-0 also has a shape of a tube or a hollow cylinder formed about axis A-A in the illustrated example. On one side, the tubular shape of closed coupler 216-0 is attached to an arm 318-0, which in turn is attached at substantially a right angle with a second end plate 320-0. Second end plate 320-0 abuts second end 210-0 (not shown) on barrier 204-0 opposite to arm 318-0. Second end plate 320-0 is integrally formed with one or more reinforcement bars that pass within the body of barrier 204-0, namely, first reinforcement 322-0, second reinforcement 324-0, and third reinforcement 326-0, and provide structural support for closed coupler 216-0. Closed coupler 216-0, arm 318-0, second end plate 320-0, first reinforcement 322-0, second reinforcement 324-0, and third reinforcement 326-0 may be made of any structurally resilient materials, such as steel or other metals. Closed coupler 216-0 also includes top hole 328-0 and bottom hole 330-0 positioned vertically along the A-A axis in one implementation. Similarly, alignment hole 332-0 is positioned vertically along the A-A axis.

As indicated by top hole 328 in FIG. 3, closed coupler 216-0 as part of barrier assembly 202-0 may be moved vertically along axis A-A into engagement with open coupler 218-1. Although not shown in FIG. 3, in some examples, barrier 204-1 associated with open coupler 218-1 is resting on the ground, and barrier 204-0 associated with closed coupler 216-0 is lowered from a raised position using a forklift or similar equipment. Dimensions for open coupler 218-1, central slot 316-1, closed coupler 216-0, and arm 318-0 can determine at least the mating relationship for engagement. In the illustrated example, an outer diameter 410 (FIG. 4) of closed coupler 216-0 is smaller than an inner diameter 412 (FIG. 4) of open coupler 218-1, such that closed coupler 216-0 can be lowered vertically along axis A-A into open coupler 218-1. Moreover, central slot 316-1 has a width between vertical edges of open coupler 218-1, and arm 318-0 is dimensioned with a thickness less than the width of central slot 316-1. As a result, as barrier 204-0 is lowered, arm 318-0 may pass freely through central slot 316-1 and closed coupler 216-0 may pass freely into open coupler 218-1. While engagement 300 in FIG. 3 depicts a lowering of closed coupler 216-0, movement of open coupler 218-1 relative to closed coupler 216-0 could alternatively occur, such as a lowering of open coupler 218-1 over open coupler 218-0. Accordingly, closed coupler 216-0 and open coupler 218-1 form complementary connector halves that mate in a loose configuration and help in positioning two barriers, such as barrier 204-0 and barrier 204-1, in an end-to-end relationship.

Figure 4:
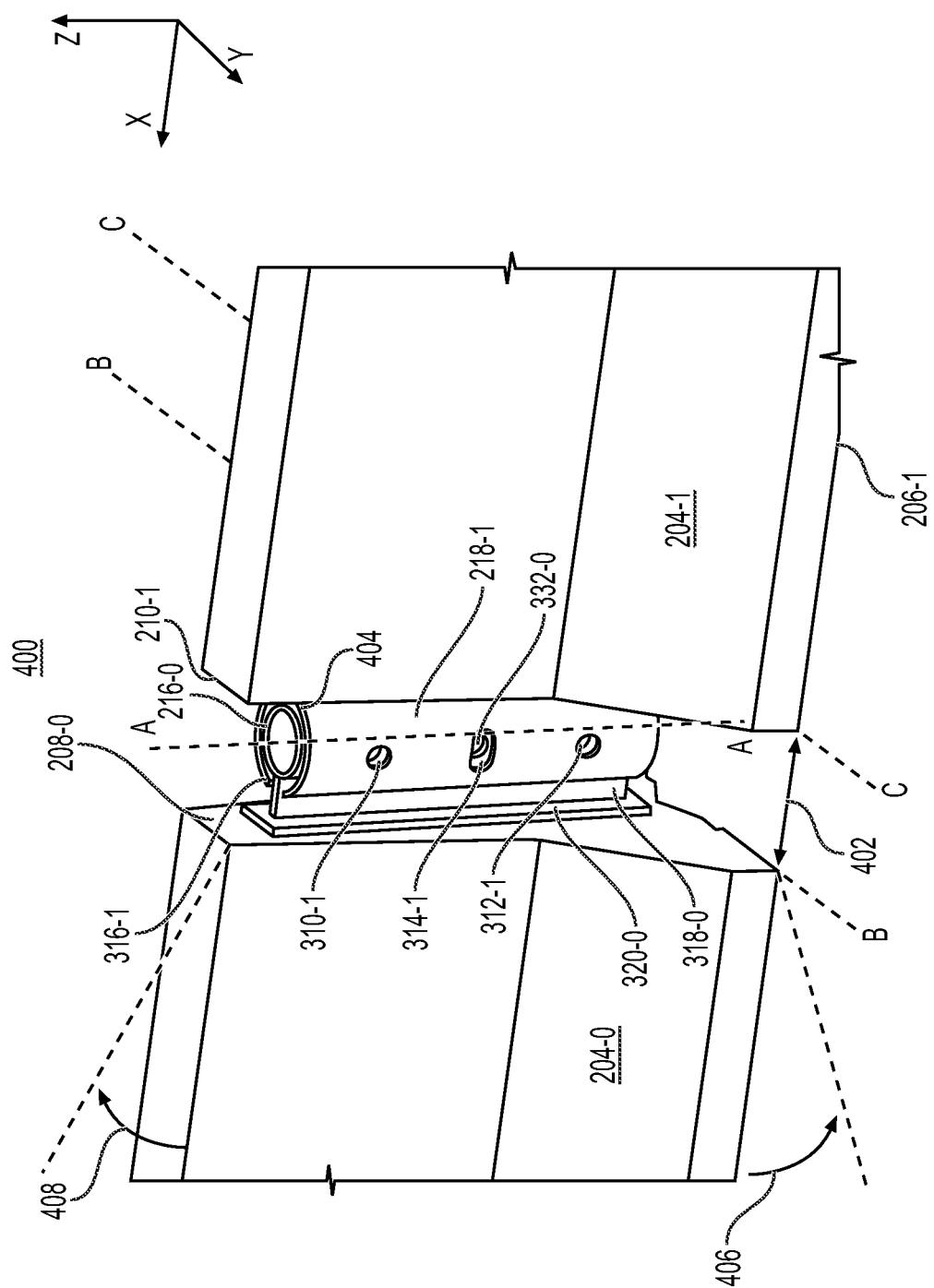
FIG. 4 is an isometric view of a coupling between adjacent barrier assemblies in accordance with an example of the present disclosure.
Figure 5:
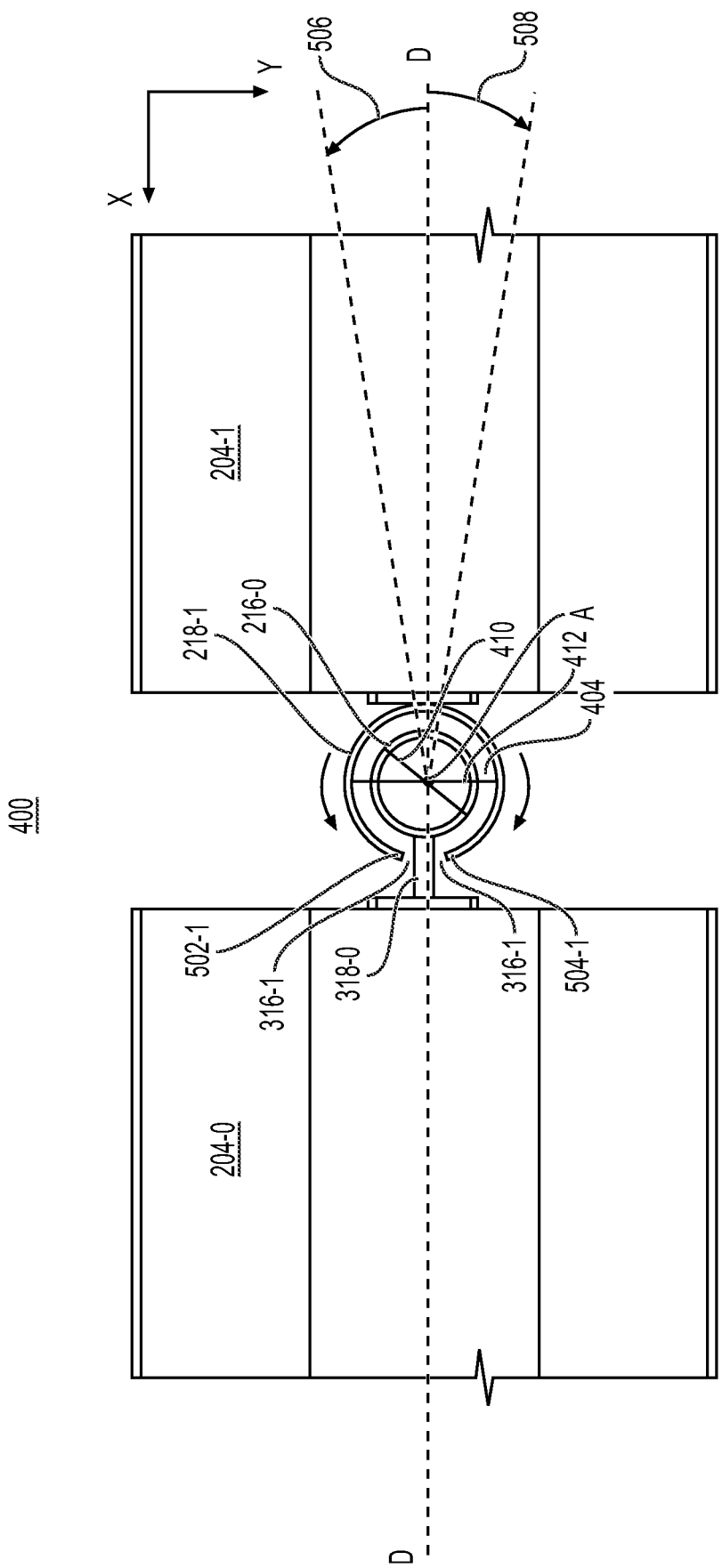
FIG. 5 is a top view of the coupling between adjacent barrier assemblies of FIG. 4 in accordance with an example of the present disclosure.

While FIG. 3 depicts engagement 300 for closed coupler 216-0 and open coupler 218-1 based on their illustrated shapes as tubes having different diameters, closed coupler 216-0 and open coupler 218-1 can also help guard against undesired angular positions of barrier 204-0 with respect to barrier 204-1. In general, sharp deviations in the positioning of power rail 108 can lead to a disconnection of contactor 118 if maneuverability or steering of work machine 100 becomes difficult, and alignment of conductor rod 106 and trailing arms 116 with power rail 108 may erode. Moreover, excess curvature to power rail 108 can impact the installation and life of the rails or require that rail segments have specialized shapes or dimensions. For example, bends in haul route 101 that are sharp, which may correspond to a radius of curvature of about 10 degrees per 20 feet or more, or slopes in haul route 101 that are steep, which may correspond to a slope change of about 3.5 degrees per 20 feet or more, could increase the risk of disconnection between contactor 118 and power rail 108 or otherwise impact the use of power rail 108. FIGS. 4 and 5 illustrate how closed coupler 216-0 and open coupler 218-1 can avoid extreme bends or slopes for power rail 108, in some examples, by restricting the angular position of adjacent barriers.

FIG. 4 shows a barrier connection 400 with a completed coupling between closed coupler 216-0 of barrier 204-0 and open coupler 218-1 of barrier 204-1. As illustrated, an outer diameter 410 of closed coupler 216-0 fits within an inner diameter 412 of open coupler 218-1 such that open coupler 218-1 and closed coupler 216-0 are arranged concentrically about axis A-A. In this position, a barrier separation 402 between barrier 204-0 and barrier 204-1 is established longitudinally, i.e., along the X axis in FIG. 4, which is driven by the size and shape of closed coupler 216-0 and open coupler 218-1. In particular, barrier separation 402 will be defined by a distance between first end 208-0 and a center of closed coupler 216-0 along axis A-A plus a distance between second end 210-1 and a center of open coupler 218-1 along the axis A-A. The size of an annular gap 404 between closed coupler 216-0 and open coupler 218-1 provides a tolerance for barrier separation 402 in the event closed coupler 216-0 and open coupler 218-1 are not aligned exactly about the same centerline, as in axis A-A. Annular gap 404 also defines a permitted deviation laterally between barrier 204-0 and barrier 204-1, i.e., along the Y axis in FIG. 4. As a result, in one example, barrier connection 400 using closed coupler 216-0 and open coupler 218-1 provides for precise longitudinal and lateral positioning of barrier 204-0 with respect to barrier 204-1 within a tolerance built into the geometry of the coupling.

Barrier connection 400 additionally ensures that barrier 204-0 and barrier 204-1 are not positioned on a surface with too large of a slope change, such as exceeding 3.5 degrees per 20 feet. Slope change in the context of FIG. 4 refers to, for example, rotation or tilt of barrier connection 400 about the Y axis in the X-Z plane, such as if barrier 204-0 were uphill or downhill from barrier 204-1. In one example, barrier 204-0 could rest on a slope such that barrier 204-0 essentially pivots around an axis B-B with respect to barrier 204-1, shown in FIG. 4 as being parallel to the Y axis. Barrier 204-0 could rest on a downhill slope relative to base 206-1, such as shown by downslope angle 406, or on an uphill slope, such as shown by upslope angle 408. If barrier 204-0 rests on a downslope, for instance, base 206-0 will be positioned around axis B-B at downslope angle 406. In that situation, closed coupler 216-0 will likewise be rotated or tilted at an angle similarly as downslope angle 406 with respect to open coupler 218-1. At a predetermined amount of slope change, closed coupler 216-0 will have rotated sufficiently through annular gap 404 to contact open coupler 218-1 at an upper portion of both tubes. The contact between the tubes will provide an outer limit to the amount of slope change for barrier 204-0 permitted by the coupling. In one example, the size of annular gap 404 and a height for closed coupler 216-0 and open coupler 218-1 are determined such that downslope angle 406 is about 3.5 degrees. This dimensioning of closed coupler 216-0 and open coupler 218-1 may vary based on the configuration chosen for the couplers and is within the knowledge of those of ordinary skill in the art. Similar behavior and dimensioning will apply to a rotation or tilt for barrier 204-0 on an uphill slope across upslope angle 408. Also, it will be understood that, for the same reasons, the concentric tubes of closed coupler 216-0 and open coupler 218-1 and annular gap 404 also provide a limit to excessive slope changes for barrier 204-1 relative to barrier 204-0 that may occur about axis C-C in FIG. 4.

In addition to assisting with longitudinal displacement, lateral displacement, and slope change, barrier connection 400 can also ensure that barrier 204-0 and barrier 204-1 are not arranged with too large of a lateral rotation about axis A-A, which may lead to undue stress on power rail 108. This angle of lateral rotation can translate into a curvature for power rail 108, which in the context of FIG. 4 refers to, for example, rotation about the Z axis in the X-Y plane. FIG. 5 shows a top view of barrier connection 400 and indicates the positional restrictions provided by closed coupler 216-0 and open coupler 218-1 in the X-Y plane.

Referring to FIG. 5, while having a general tubular shape overall, open coupler 218-1 at a top view as in FIG. 5 also has a C-shape as its circumference spans from first vertical edge 502-1 to second vertical edge 504-1. Central slot 316-1 is defined by a first vertical edge 502-1 and a second vertical edge 504-1 and runs vertically and parallel to axis A-A. In the X-Y plane, central slot 316-1 spans the distance between first vertical edge 502-1 and second vertical edge 504-1 and defines a space for accommodating lateral rotation of barrier 204-1 relative to barrier 204-0, or vice versa. When barrier 204-0 and barrier 204-1 are aligned, such as along axis D-D in FIG. 5, central slot 316-1 is bisected by arm 318-0 of barrier 204-0. If barrier 204-1, for example, is displaced upwards with respect to barrier 204-0 in the X-Y plane in FIG. 5 around axis A-A, open coupler 218-1 will be displaced about axis A-A as well. The portion of central slot 316-1 between first vertical edge 502-1 and arm 318-0 permits angular placement about axis A-A up to a first curvature angle 506. At first curvature angle 506, first vertical edge 502-1 will contact arm 318-0 and prevent further lateral rotation of barrier 204-1 relative to barrier 204-0. Similarly, barrier 204-1 may be displaced downwards in FIG. 5 around axis A-A with respect to barrier 204-0 to a position where second vertical edge 504-1 contacts arm 318-0, corresponding to a second curvature angle 508. In one example, closed coupler 216-0 and open coupler 218-1 are dimensioned so that first curvature angle 506 and second curvature angle 508 are both about 3.5 degrees for the 20 feet of barrier 204-1. Similar behavior and dimensioning will apply to a lateral rotation for barrier 204-1 with respect to barrier 204-0, as arm 318-0 is displaced into contact with either first vertical edge 502-1 or second vertical edge 504-1 and blocking lateral rotation beyond first curvature angle 506 or second curvature angle 508.

Referring again to FIG. 4, in some examples, alignment hole 314-1 within open coupler 218-1 provides an additional feature to assist with alignment of barrier 204-0 with respect to barrier 204-1. In some examples, alignment hole 314-1 is oblong in shape, such as an elongated circle or an oval. When closed coupler 216-0 is mated with open coupler 218-0, such as in engagement 300, and barrier 204-0 and barrier 204-1 are laterally and longitudinally aligned on a level surface, alignment hole 314-1 and alignment hole 332-0 will share a common central axis (not shown). A bolt or plug (not shown) can be inserted through alignment hole 314-1 and alignment hole 332-0 through the common central axis to confirm the alignment. As barrier 204-0 or barrier 204-1 deviate from alignment—whether through longitudinal displacement, lateral displacement, slope change, or lateral rotation—the alignment between alignment hole 314-1 and alignment hole 332-0 will decrease. At a point in which the positional deviation of barrier 204-0 and barrier 204-1 with respect to each other are beyond a designed value, alignment hole 314-1 and alignment hole 332-0 will lose their alignment to the point a bolt or plug cannot be inserted through them. This feature, which may loosely be equated with a keyed relationship between alignment hole 314-1 and alignment hole 332-0, provides an additional guide for an operator to ensure that barrier 204-0 and barrier 204-1 are properly arranged before mounting additional equipment such as support assembly 219 or power rail 108.

Accordingly, as illustrated in FIGS. 2-5, adjacent barriers may be loosely joined through closed coupler 216 and open coupler 218 to set their positioning and adjust as needed their longitudinal displacement, lateral displacement, slope change, and lateral rotation. Following engagement 300, sequential engagements of other barriers may be accomplished end-to-end along a path intended for power rail 108. Support posts, such as first support pole 220A and second support pole 220B in FIG. 2, may be inserted along axis A-A for each coupling. A consistent and stable support structure for power rail 108 can thereby be installed.

Figure 6:
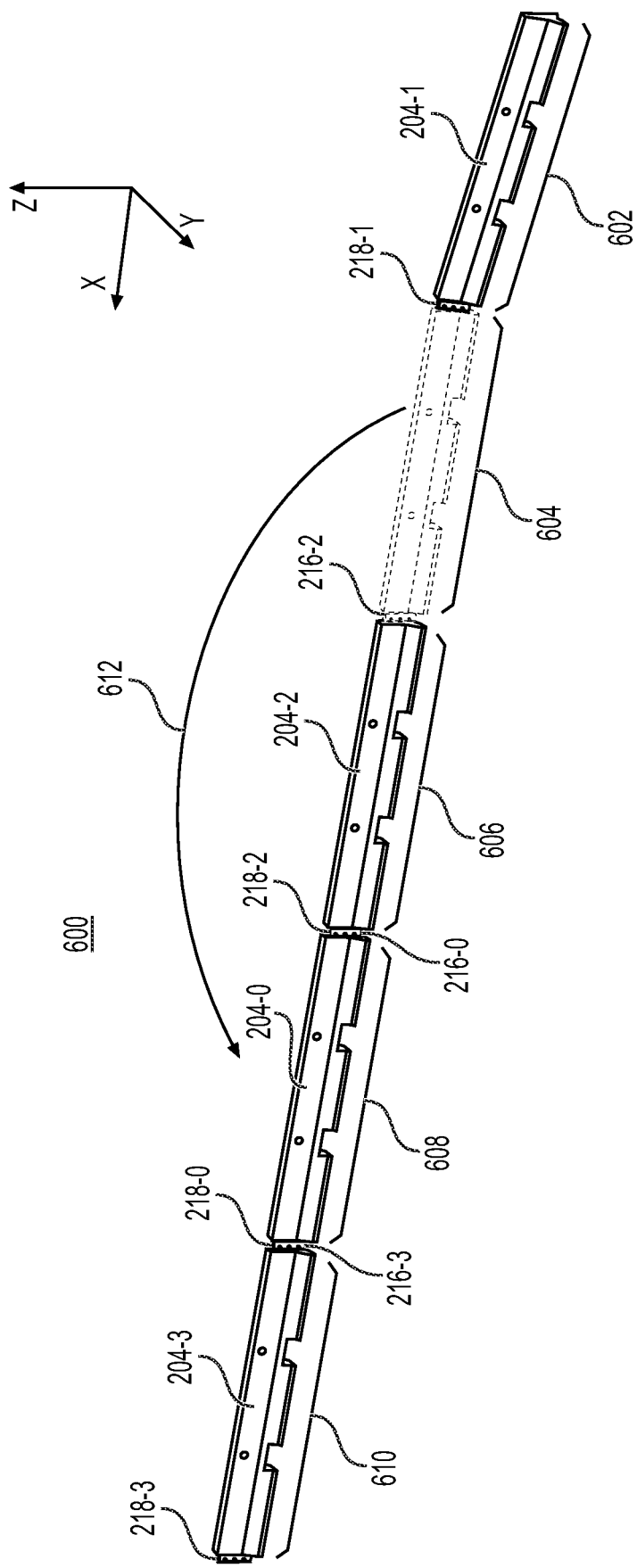
FIG. 6 is a schematic of a deployment layout for barrier assemblies in accordance with an example of the present disclosure.

FIG. 6 illustrates an exemplary scheme for deploying a support structure using rail support module 200 that reduces the number of barriers employed. As embodied in FIG. 6, a deployment layout 600 indicates that a line of end-to-end barrier assemblies, coupled in a chain via a closed coupler 216 and an open coupler 218, could each occupy a select position along haul route 101. For example, a beginning of the chain may be defined as first location 602, followed by second location 604, third location 606, fourth location 608, and fifth location 610 moving from the right to the left in FIG. 6. A method for deploying barrier assemblies within deployment layout 600 is defined by representative steps consistent with the present disclosure in the flowchart of FIG. 7. For the method of FIG. 7, as well as other methods described in this disclosure, the steps in which the method is described are not intended to be construed as a limitation. Any number of steps can be combined in any order to implement the disclosed method, can be performed in parallel to implement the processes, and in some embodiments, one or more blocks of the process can be omitted entirely. Moreover, the processes can be combined in whole or in part with other methods.

Figure 7:
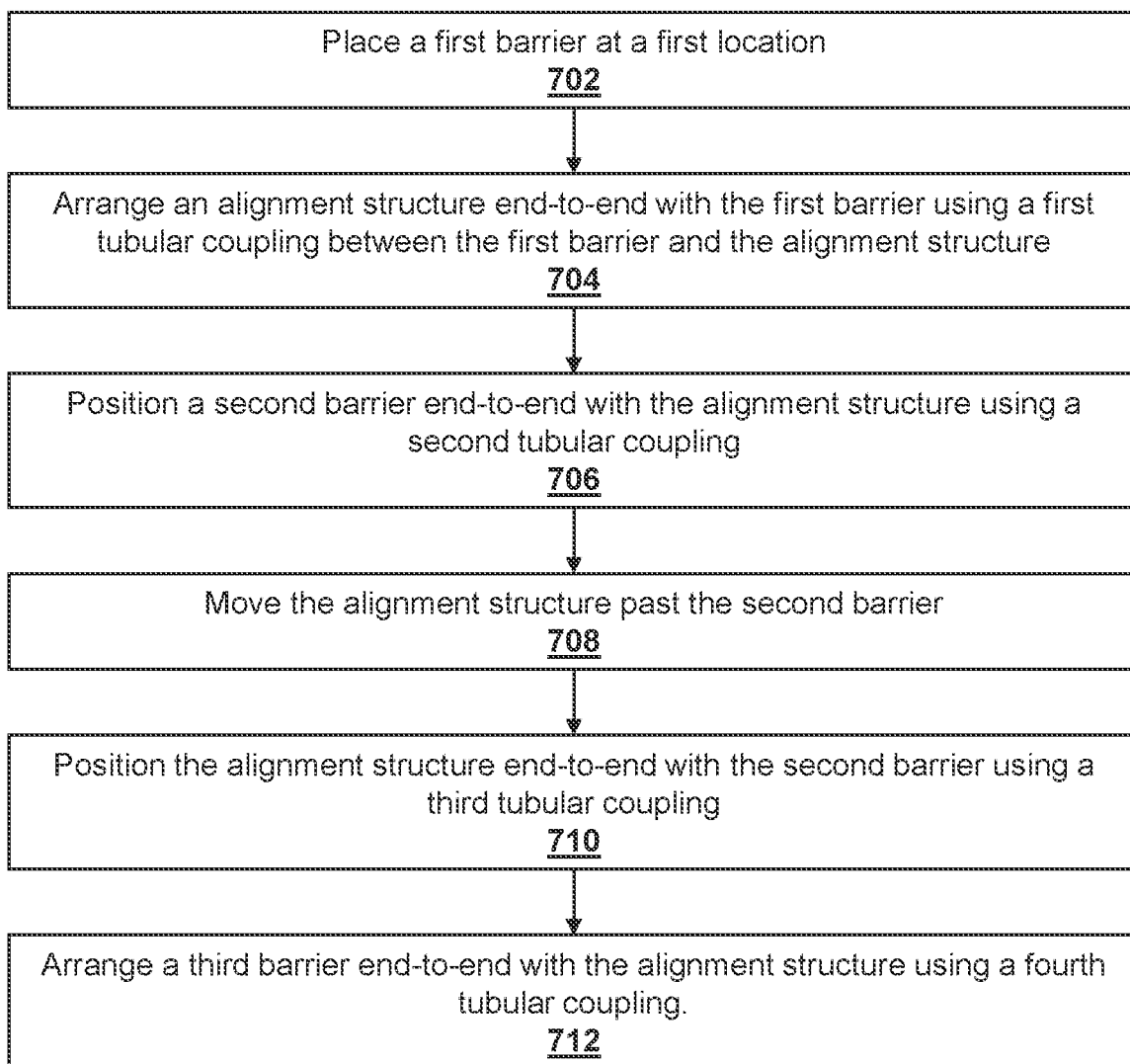
FIG. 7 is flowchart depicting a method for deploying barrier assemblies in accordance with an example of the present disclosure.

Referring to FIGS. 6 and 7 together, the method 700 in FIG. 7 begins with a first step 702 of placing a first barrier at a first location. As shown in FIG. 6, placement of a first barrier may entail situating barrier 204-1 on the ground at first location 602 using a forklift, crane, or similar equipment. barrier 204-1 includes closed coupler 216-1 and open coupler 218-1 at opposing first end 208-1 and second end 210-1 of barrier 204-1. At a second step 704 in method 700, an alignment structure is arranged end-to-end with the first barrier in single-file formation using a first tubular coupling between the first barrier and the alignment structure. Specifically, barrier 204-0 may have an identical structure and composition as barrier 204-1 and be placed at second location 604 immediately next to barrier 204-1 at first location 602. Alternatively, barrier 204-0 may have a different composition than barrier 204-1, such as being lighter and more easily moved than barrier 204-1. As with barrier 204-1, barrier 204-0 includes closed coupler 216-0 and open coupler 218-0 at its opposing first end 208-0 and second end 210-0 (FIG. 2). Following the teachings of FIGS. 3-5, closed coupler 216-0 on barrier assembly 202-0 may be lowered vertically into engagement with open coupler 218-1 on barrier assembly 202-1 at second location 604, forming a coupling of concentric tubes. At this point, the alignment of barrier assembly 202-0 with respect to barrier assembly 202-1 may be checked based on the arrangement of closed coupler 216-0 within open coupler 218-1 as well as the keyed relationship of alignment hole 314-1 and alignment hole 332-0. Adjustments may be made to the ground or the deployment location in general if the coupling does not indicate an appropriate alignment between barrier assembly 202-0 and barrier assembly 202-1.

Continuing with method 700, a step 706 includes positioning a second barrier end-to-end with the alignment structure in the single-file formation using a second tubular coupling between the second barrier and the alignment structure. Following this step, a chain of at least three barriers would be formed including a sequence of barrier 204-1, barrier 204-0, and then barrier 204-2. Barrier 204-0 may be lowered to the left of barrier 204-0 into third location 606 with closed coupler 216-2 engaging with open coupler 218-0. The coupling formed by the tubular forms within closed coupler 216-2 and open coupler 218-0 may be checked along with alignment hole 314-0 and alignment hole 332-2 to ensure that barrier 204-0 and barrier 204-2 are appropriately aligned with respect to longitudinal displacement, lateral displacement, slope change, and lateral rotation, as discussed above.

In step 708 of method 700, the alignment structure is moved past the second barrier in the single-file formation and positioned end-to-end with the second barrier. FIG. 6 illustrates with relocation arrow 612 movement of barrier assembly 202-0 from second location 604 to fourth location 608, leapfrogging over barrier 204-2 at third location 606. Phantom lines at second location 604 indicate the previous placement of barrier assembly 202-0 at second location 604. Barrier assembly 202-0 may be moved using a forklift, crane, or similar equipment. Or if barrier assembly 202-0 is embodied as a lighter structure, movement of barrier assembly 202-0 may be accomplished with lifting force not requiring a powered machine. As the position of barrier 204-1 has been confirmed as acceptable, barrier 204-1 is left in place at first location 602. Barrier assembly 202-0 in FIG. 6 is lowered to the left barrier 204-2 so that closed coupler 216-0 aligns vertically with open coupler 218-2 to form concentric tubes. As previously discussed for other barrier assemblies, the positioning of barrier 204-2 can be checked relative to barrier 204-0 and, therefore, the ground conditions at third location 606 and fourth location 608 can be confirmed as acceptable for the support structure of power rail 108.

In step 712 of FIG. 7, a third barrier is arranged end-to-end with the alignment structure using a fourth tubular coupling. In particular, barrier 204-3 is added, typically using heavy lifting equipment, into fifth location 610 to be longitudinally adjacent barrier assembly 202-0 at fourth location 608, as shown in FIG. 6. The fourth tubular coupling in some examples includes the vertical mating of closed coupler 216-3 with open coupler 218-0. Checking of the alignment through the coupling, such as via alignment hole 314-3, can indicate whether the positioning of closed coupler 216-3 and barrier assembly 202-0 are acceptable with respect to each other.

The sequence of FIG. 7 may be continued indefinitely along haul route 101. As a result, method 700 enables positioning of multiple ones of barrier assembly 202 on a path for constant and stable support of power rail 108. Excesses in at least longitudinal displacement, lateral displacement, slope change, and lateral rotation can be avoided using closed coupler 216 and open coupler 218. Moreover, using barrier assembly 202-0 as an alignment structure in the manner of FIGS. 6 and 7, where barrier assembly 202-0 is repeatedly placed between two other barrier assemblies 202 for an alignment check and then moved as with relocation arrow 612, a support structure for power rail 108 can be built using up to half of the barrier assemblies 202 employed for a continuous wall. The support structure resulting from FIGS. 6 and 7 would in essence be an alternating sequence of barrier assemblies 202 and empty spaces. For example, in a final assembly from FIG. 6, rail support module 200 would occupy first location 602, third location 606, and fifth location 610, while second location 604 and fourth location 608 would be empty. As will be appreciated, because rail segments 240 in the example of rail support module 200 extend beyond first support pole 220A and second support pole 220B by about 25%, ends of the rail segments 240 from one rail support module 200, such as a rail segment 234-1 of rail support module 200-1 at first location 602, can be joined with ends of the rail segments 240 in the next rail support module 200, such as a rail segment 234-2 of rail support module 200-2 at third location 606. FIGS. 11 and 12 and the discussion about them below explain examples for joining ends of rail segments 240 for this support structure.

Following or during deployment of barrier assembly 202, first support pole 220A and second support pole 220B may be installed within closed coupler 216 and open coupler 218 at opposite ends first end 208 and second end 210 of barrier 204. In some examples, an inner diameter 412 of closed coupler 216 and an inner diameter of open coupler 218 (FIGS. 3 and 4) each are sufficient to receive and retain first lower portion 238A of first support pole 220A and second lower portion 238B of second support pole 220B, respectively. Once installed vertically along axes A-A in closed coupler 216 and open coupler 218, first support pole 220A and second support pole 220B are secured in place using plugs or bolts, such as one or more of first coupler pin 224A, second coupler pin 224B, and third coupler pin 224C.

Figure 8:
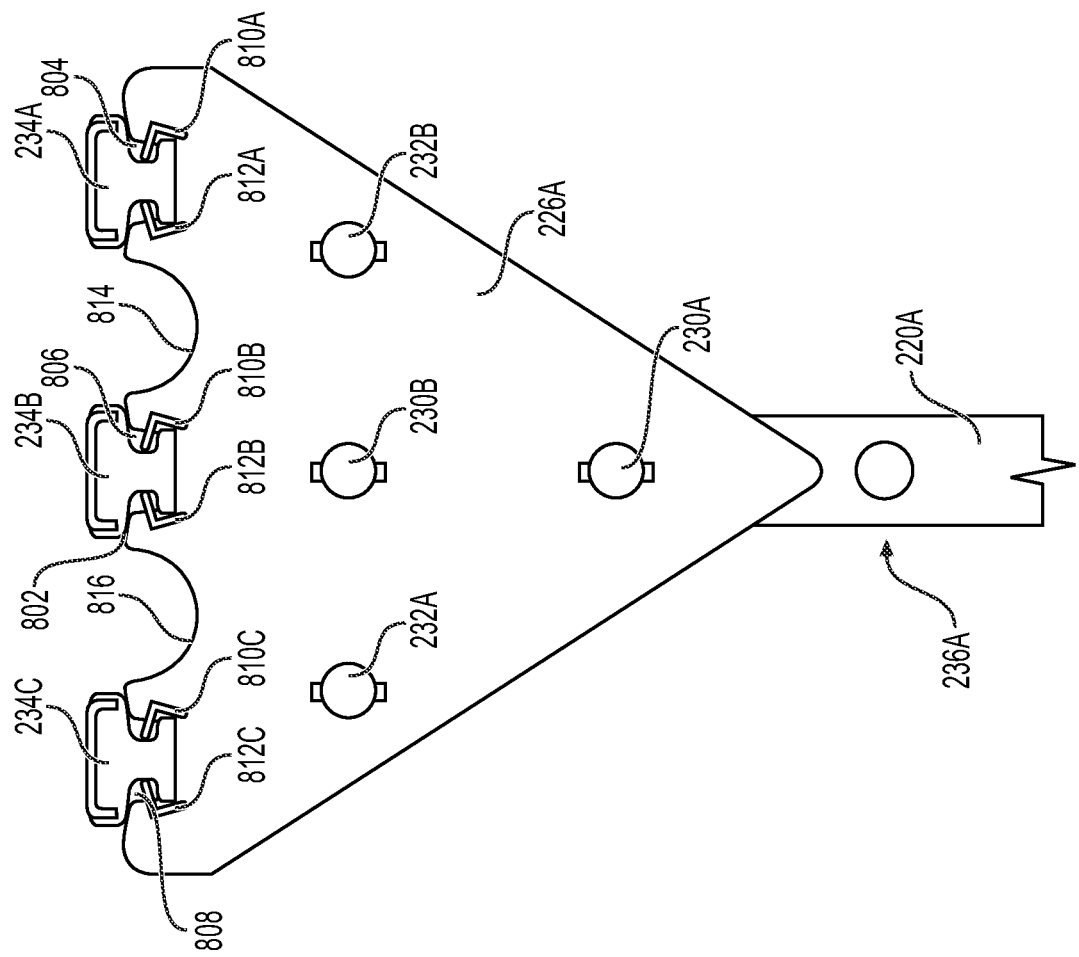
FIG. 8 is a partial front view of a support assembly with rail segments in accordance with an example of the present disclosure.

First upper portion 236A of first support pole 220A, for example, distal from barrier 204 includes a mounting structure formed by first front plate 226A and first rear plate 228A (FIG. 2) for holding rail segments 240 safely in place. FIG. 8 is a front view of first support pole 220A and first front plate 226A from the perspective looking in the direction of forward travel for work machine 100, i.e., parallel to the X axis. In some examples, first front plate 226A is a flat structure made of pultruded FRP, as mentioned above, although other dielectric materials may be alternatives. First front plate 226A is attached to first support pole 220A by way of first plate pin 230A and second plate pin 230B. As first support pole 220A may have a round cross-section and a curved surface, first lateral pin 232A and second lateral pin 232B connect first front plate 226A to first rear plate 228A (FIG. 2) and provide lateral stability for first front plate 226A and second front plate 226B.

In the example illustrated, first front plate 226A has a triangular shape residing in the Y-Z plane of FIG. 8. Parallel to the Y axis and ultimately to base 206 of barrier 204 and ground, top edge 802 forms one side of the triangular shape for first front plate 226A as a horizontal surface that provides direct support for rail segments 240. In some examples, top edge 802 includes a series of cuts or openings along its surface. In particular, top edge 802 includes one or more slots for holding rail segments 240, such as inner rail recess 804, middle rail recess 806, and outer rail recess 808 in the example of FIG. 8. Besides providing a structural base for 234, the one or more slots are separated sufficiently across top edge 802 to exceed relevant rail-to-rail clearance criteria. In one example, a center-to-center distance between adjacent slots, such as between inner rail recess 804 and middle rail recess 806, is 200 mm.

Figure 9:
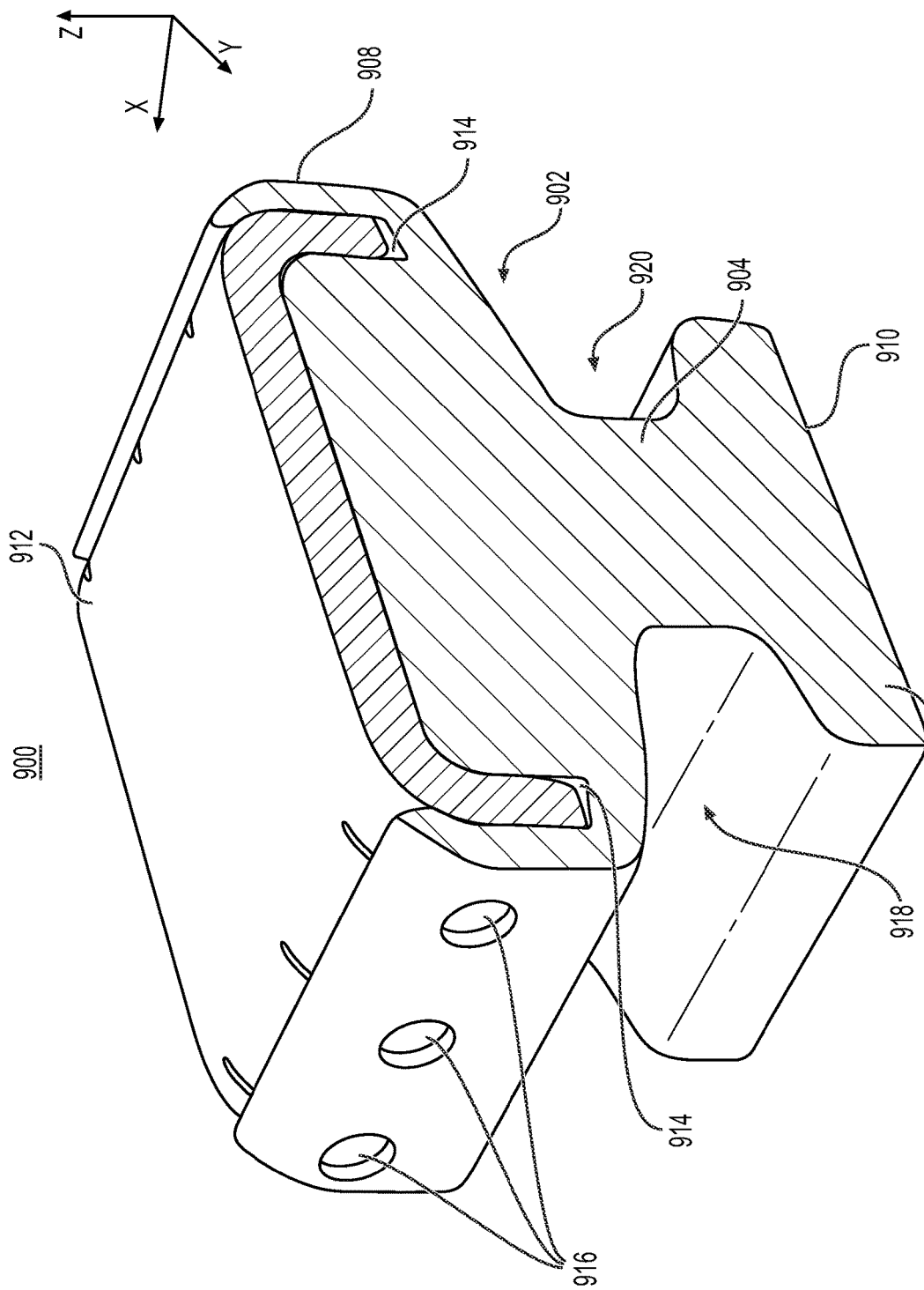
FIG. 9 is a partial cross-sectional view of a rail segment in FIG. 2 in accordance with an example of the present disclosure.

FIG. 9 illustrates the structure of example rail segments 240 held within inner rail recess 804, middle rail recess 806, and outer rail recess 808 of first front plate 226A. A representative portion 900 of inner rail segment 234A has a rail body 902 in the form of a modified I-beam made of aluminum. A rail web 904 in the center of representative portion 900 separates a lower flange 906 from an upper flange 908, forming a first rail groove 918 and a second rail groove 920 on opposite sides of rail web 904. A rail bottom 910 is at an underside of rail body 902. An upper plate 912, which is stainless steel, is curved into an upside-down U-shape and positioned on lateral sides of upper flange 908. Crimping, as reflected by crimp pocks 916 in FIG. 9, can secure upper plate 912 within slots 914.

Turning back to FIG. 8, inner rail recess 804 is configured to receive at least lower flange 906 of inner rail segment 234A and allow rail bottom 910 of inner rail segment 234A to rest on top edge 802. In some examples, as shown in FIG. 7, rail web 904 also rests within inner rail recess 804, although rail web 904 may also extend above top edge 802, for instance due to a shallowness of inner rail recess 804 or a height of inner rail segment 234A. In this configuration, the exposure of upper plate 912 vertically above top edge 802 enables unobstructed engagement by contactor 118 with inner rail segment 234A without excess maneuvering by conductor rod 106 on work machine 100. To help stabilize inner rail segment 234A within inner rail recess 804, a first inner insert 810A and a second middle insert 812B are pressed into grooves in the sides of inner rail recess 804 to frictionally lock inner rail segment 234A in place. First inner insert 810A and second middle insert 812B are made of dielectric material, such as FRP. While depicted in FIG. 8 as angles, first inner insert 810A and second middle insert 812B may have other shapes or forms. In some examples, the frictional locking of inner rail segment 234A provides some pliability to the attachment of rail segments 240 to first front plate 226A to accommodate small movements that may occur with either inner rail segment 234A or first front plate 226A. Similar arrangements exist in FIG. 8 for other ones of rail segments 240 that may be implemented in rail support module 200, such as first middle insert 810B and second middle insert 812B for middle rail segment 234B within middle rail recess 806 and first outer insert 810C and second outer insert 812C for outer rail segment 234C within outer rail recess 808. Also, while not depicted in FIG. 8, a matching configuration is provided for first rear plate 228A on the opposite side of first support pole 220A (FIG. 2).

Between respective recesses, first front plate 226A includes curvatures within top edge 802. As shown in FIG. 8, first concavity 814 is located on top edge 802 between inner rail recess 804 and middle rail recess 806, and second concavity 816 is located between middle rail recess 806 and outer rail recess 808. By being curved, first concavity 814 and second concavity 816 provide increased distance through first front plate 226A between adjacent rail segments. The depth, curvature, and overall shape of first concavity 814 and second concavity 816 may be selected by the skilled artisan to accomplish the objectives of increasing creepage beyond criteria while maintaining mechanical resiliency to first front plate 226A. While not shown, similar concavities exist within opposing first rear plate 228A between inner rail segment 234A, middle rail segment 234B, and outer rail segment 234C.

Figure 10:
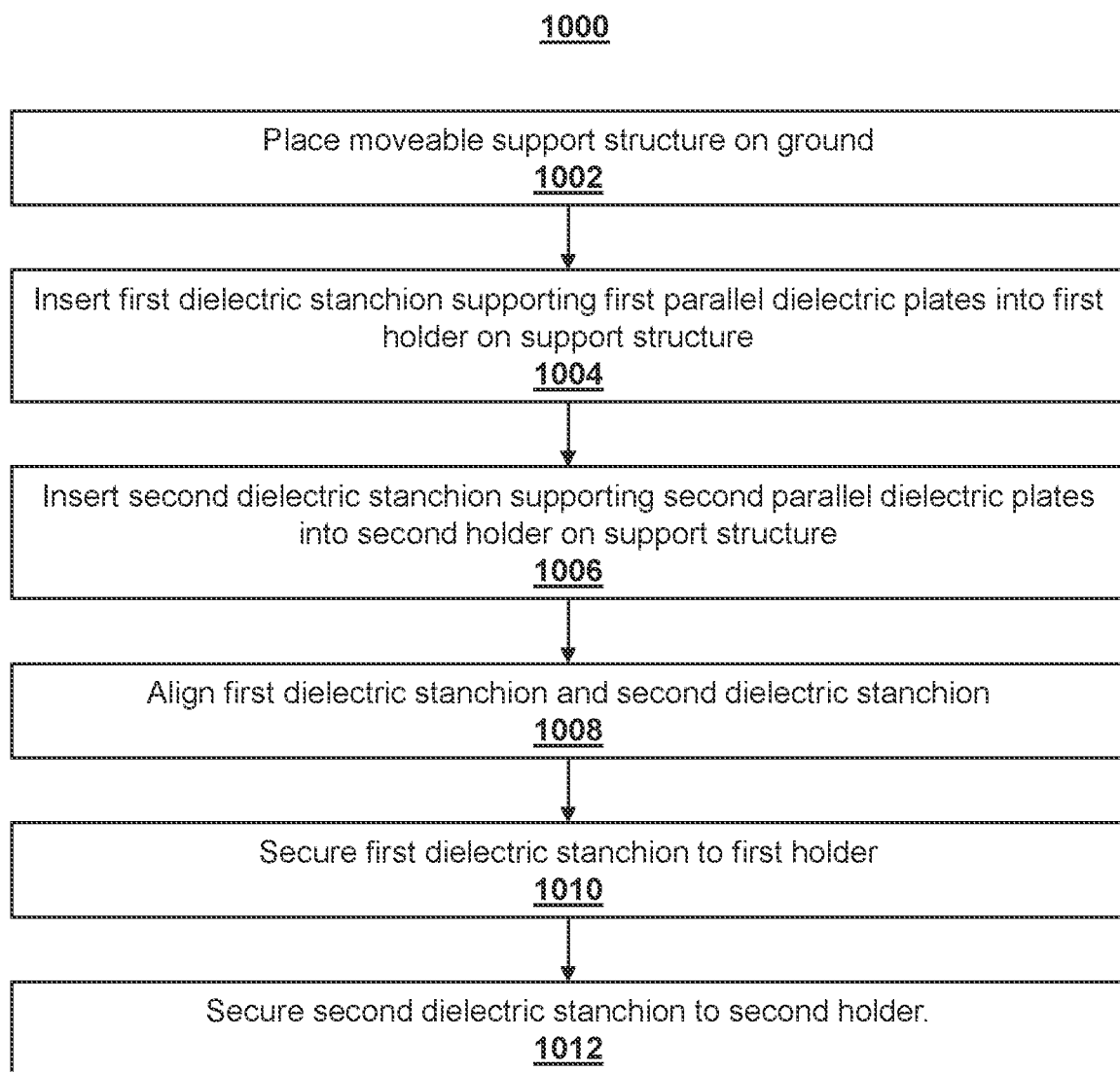
FIG. 10 is a flowchart of a method of deploying power rails in accordance with an example of the present disclosure.

A method 1000 for deploying power rails for a work machine is defined by representative steps consistent with the present disclosure in the flowchart of FIG. 10. For method 1000, as well as other methods described in this disclosure, the steps in which the method is described are not intended to be construed as a limitation. Any number of steps can be combined in any order to implement the disclosed method, can be performed in parallel to implement the processes, and in some embodiments, one or more blocks of the process can be omitted entirely. Moreover, the processes such as 1000 can be combined in whole or in part with other methods. In a first step 1002, a moveable support structure is placed on the ground. For instance, as described above, a barrier 204 may be located along a side of a haul route 101 using a forklift, crane, or other lifting equipment. barrier 204 may include closed coupler 216 and open coupler 218 at opposite ends that are separated along a horizontal axis by a base 206. At a step 1004, a lower portion of a first dielectric stanchion is inserted into a first holder affixed to the support structure, where the first dielectric stanchion has an upper portion supporting first parallel dielectric plates on opposite sides of the first dielectric stanchion. In one example, a first upper portion 236A of a first support pole 220A is inserted into closed coupler 216 that is affixed to first end 208 on barrier 204. first front plate 226A and first rear plate 228A are attached in parallel on opposite sides of first support pole 220A using first plate pin 230A and second plate pin 230B, as well as first lateral pin 232A and second lateral pin 232B.

In FIG. 10, method 1000 continues with step 1006 of inserting a lower portion of a second dielectric stanchion into a second holder affixed to the support structure, the second dielectric stanchion having an upper portion supporting second parallel dielectric plates on opposite sides of the second dielectric stanchion. In some examples, a second upper portion 236B of a second support pole 220B is inserted into open coupler 218 that is affixed to second end 210 on barrier 204. second front plate 226B and second rear plate 228B are attached in parallel on opposite sides of second support pole 220B, as shown in FIG. 2. In step 1008, a first pair of rail recesses on the first parallel dielectric plates and a second pair of rail recesses on the second parallel dielectric plates are aligned according to the lower portion of the first dielectric stanchion in the first holder and the lower portion of the second dielectric stanchion in the second holder. As indicated for FIG. 8, first front plate 226A includes inner rail recess 804, middle rail recess 806, and outer rail recess 808, as do first rear plate 228A, second front plate 226B, and second rear plate 228B.

Alignment of the four sets of inner rail recess 804, four sets of middle rail recess 806, and four sets of outer rail recess 808 within support assembly 219 can occur in various means. In one approach, the openings within the recesses may be visually or optically aligned during installation of barrier 204. In another approach, the alignment of the recesses may be preconfigured into the position of the attachment devices securing the stanchions to the coupling devices as a keyed relationship. For example, top hole 328 and bottom hole 330 on closed coupler 216 and top hole 310 and bottom hole 312 on open coupler 218 may be coordinated in advance with the positions of corresponding holes in first support pole 220A and second support pole 220B so that the holes align when the rail recesses at first upper portion 236A of first support pole 220A and second upper portion 236B of second support pole 220B align. Therefore, attaching first support pole 220A using first coupler pin 224A and third coupler pin 224C and attaching second support pole 220B using first coupler pin 224A and third coupler pin 224C can indicate alignment of the rail recesses. As a result, method 1000 concludes with securing the lower portion of the first dielectric stanchion to the first holder (step 1010) and securing the lower portion of the second dielectric stanchion to the second holder (step 1012).

Accordingly, consistent with the principles of the present disclosure, after being situated as desired on the ground, barrier 204 may be enhanced with support assembly 219 to provide a foundation for positioning and holding power rail 108. first support pole 220A and second support pole 220B enable power rail 108 to be elevated from the ground outside the normal reach of a person 222 to enhance safety for personnel and to protect power rail 108 from debris or undesired manipulation. After two or more second inner insert 812A, second middle insert 812B, and second outer insert 812C are aligned, inner rail segment 234A, middle rail segment 234B, and outer rail segment 234C may be installed within the recesses and lodged into place, for example, using first inner insert 810A and second inner insert 812A for inner rail segment 234A. At this stage, the combination rail segments 240, support assembly 219, and 234 results in a complete assembly for rail support module 200.

In at least one example, rail segments 240 are manufactured, or at least installed, being pre-bent, i.e. having a curvature in the X-Y plane. In this example, rail segments 240 are 41 feet in length and are pre-bent longitudinally to have 10 degrees of curvature in the X-Y plane. When installed along a straight section of haul route 101, rail segments 240 would be straightened, such as by hand, during installation into rail support module 200 to have 0 degrees of curvature. For installations along a curve in haul route 101, rail segments 240 could remain pre-bent at 10 degrees of curvature or additionally bent to up to 20 degrees of curvature as required to match the shape of haul route 101. The same curvatures could be attained by reversing the direction or orientation of the rail segment. As a result, a generic component for rail segments 240 could be used throughout haul route 101 to adapt to degrees of curvature along the path ranging from −20 degrees (e.g., a rail segment pre-bent by 10 degrees in the X-Y plane towards the −Y axis being additionally bent by 10 degrees towards the −Y axis) to +20 degrees of curvature (e.g., a rail segment pre-bent by 10 degrees in the X-Y plane towards the +Y axis being additionally bent by 10 degrees towards the +Y axis). Besides helping to adapt to curvatures in haul route 101, pre-bending of rail segments 240 can also help accommodate thermal expansion and contraction of power rail 108.

Figure 12:
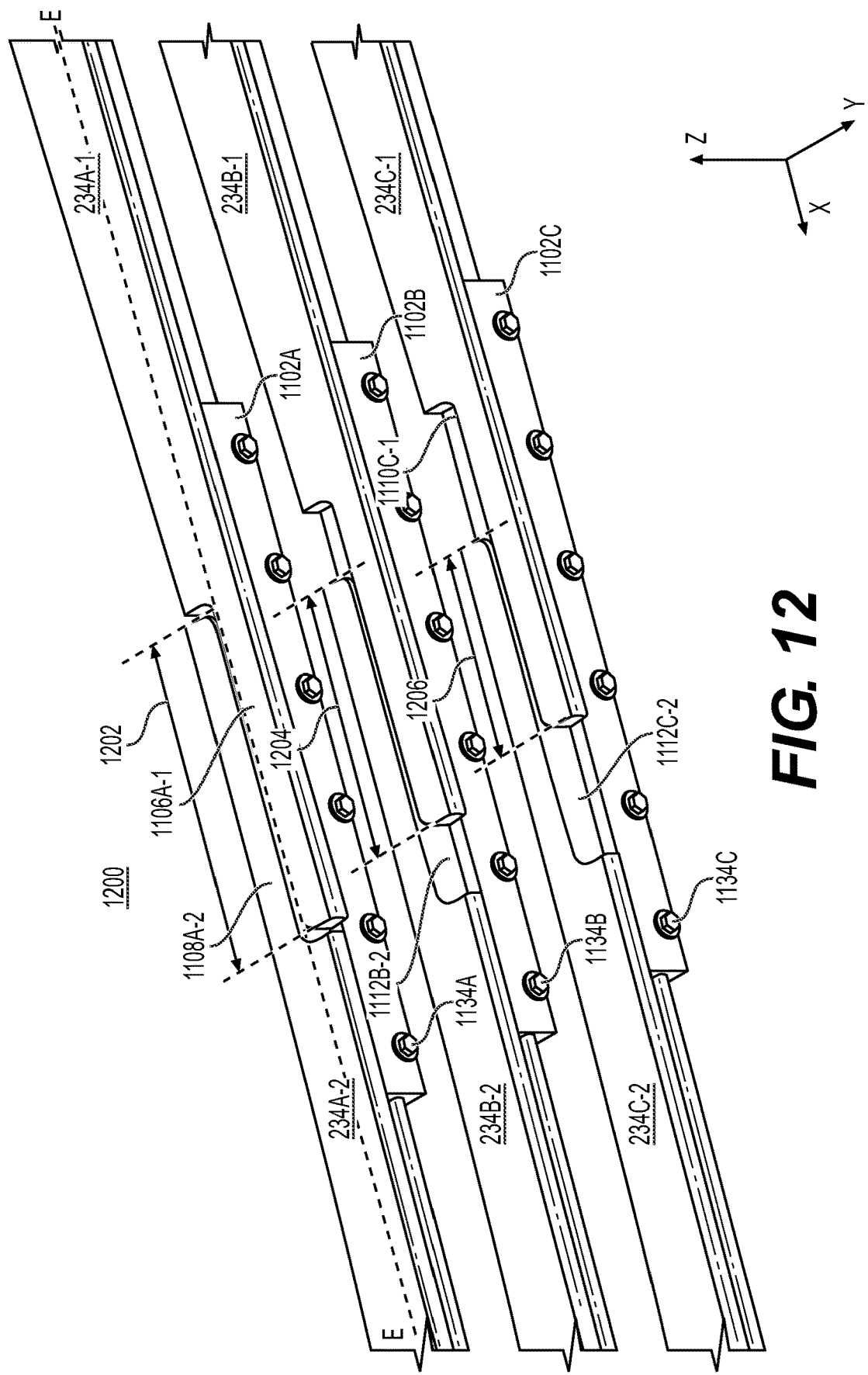
FIG. 12 is an isometric view of a collective rail joint of three rail segments within three fishplates traversing a curvature in accordance with an example of the present disclosure.
Figure 13:
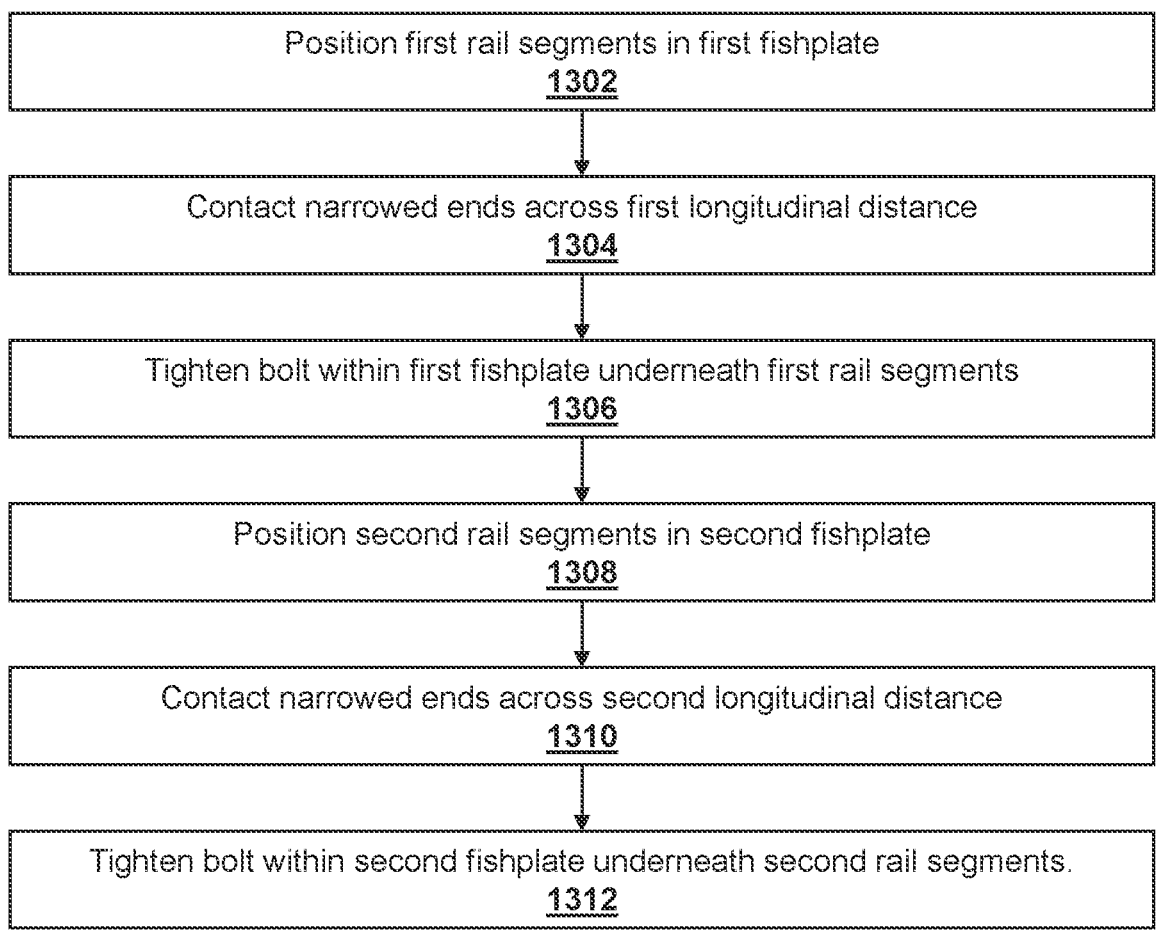
FIG. 13 is a flowchart of a method for joining rail segments in accordance with an example of the present disclosure.

With each rail support module 200 placed at alternating positions along a path, such as at first location 602, third location 606, and fifth location 610 in FIG. 6, a remaining step to establish continuity for delivering electrical power through power rail 108 is joining ends of rail segments 240 between adjacent ones of rail support module 200. FIGS. 11-13 illustrate one example for joining ends of rail segments 240.

Figure 11A:
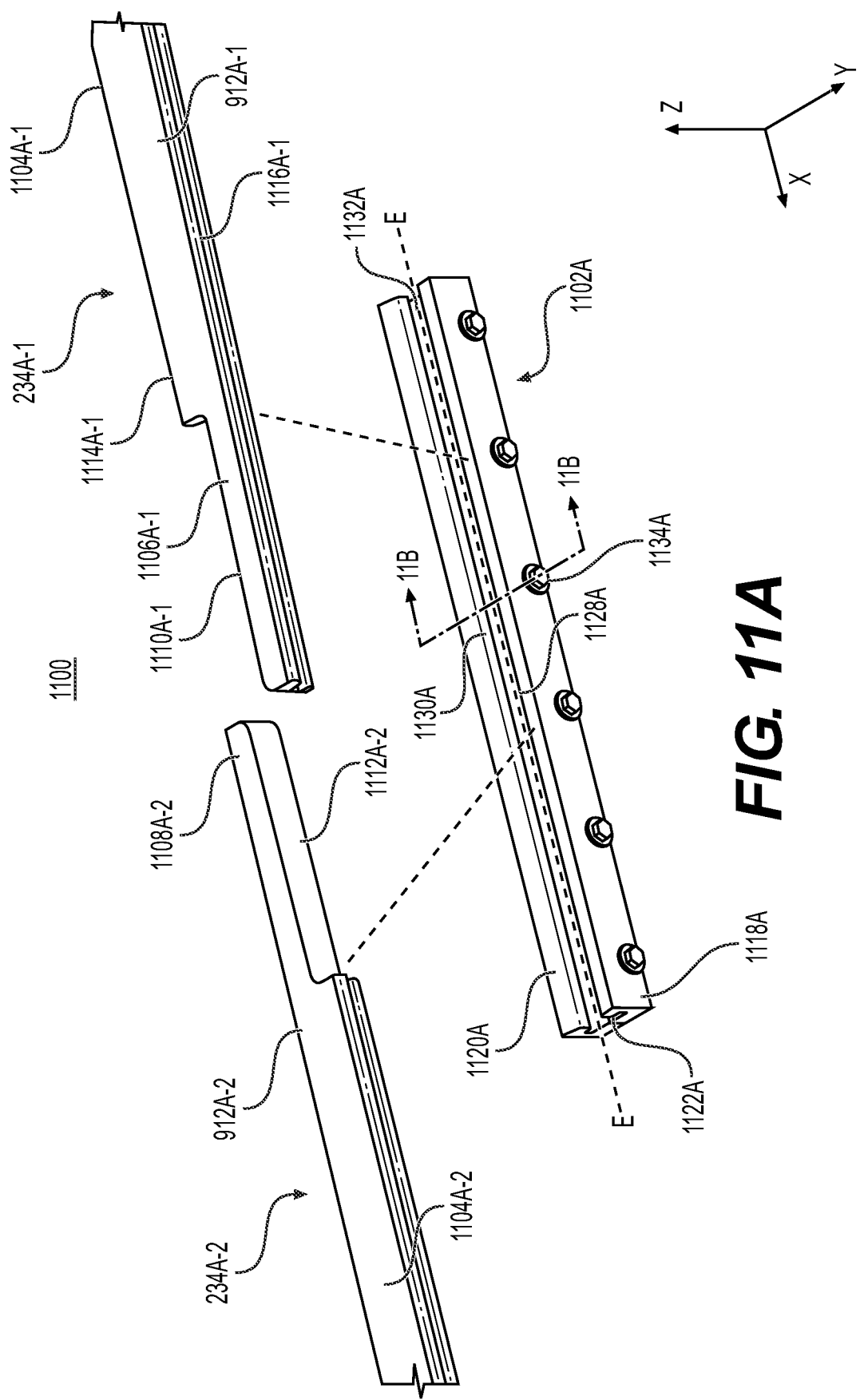
FIG. 11A is an exploded view of a single rail joint of two rail segments within a fishplate in accordance with an example of the present disclosure.
Figure 11B:
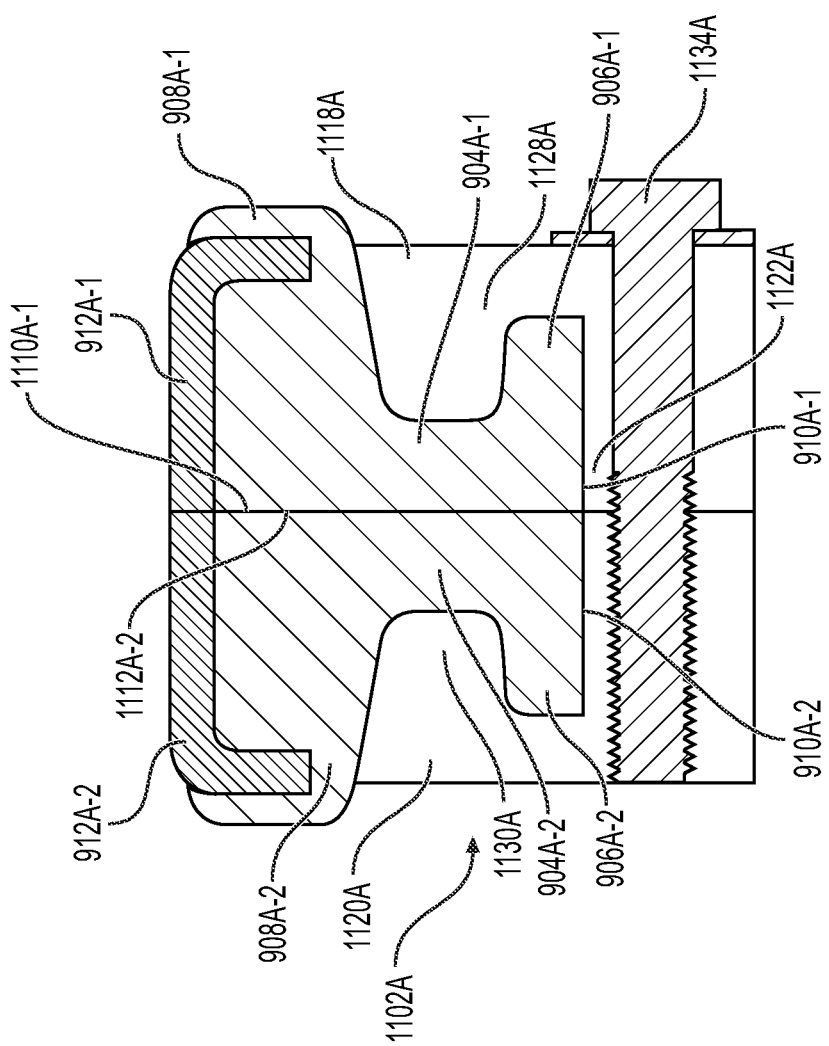
FIG. 11B is a cross-sectional view of the single rail joint of FIG. 11A within a fishplate in accordance with an example of the present disclosure.

FIG. 11A is an exploded view of a single rail joint 1100 bringing together representative inner rail segment 234A-1 and inner rail segment 234A-2 within a fishplate 1102A, while FIG. 11B is a cross-sectional view of the single rail joint 1100 along the cutaway lines shown in FIG. 11A. While FIGS. 11A and 11B show inner rail segment 234A and components affiliated with inner rail segment 234A (also bearing the suffix "A" relating to the inner rail), the arrangement depicted for inner rail segment 234A would also apply to middle rail segment 234B and outer rail segment 234C. Consistent with the nomenclature explained above, in these examples, inner rail segment 234A-1 is the rail segment on the inner side of rail support module 200-1 at first location 602 in FIG. 6 (i.e., closest to haul route 101), while inner rail segment 234A-2 is the rail segment in the same position on rail support module 200-2 at third location 606. Inner rail segment 234A-1 includes a main section 1104A-1 and a first end 1106A-1, while inner rail segment 234A-2 includes a main section 1104A-2 and a second end 1108A-2 in FIG. 11A. While not shown in FIG. 6, inner rail segment 234A-1 includes a second end 1108A-1 at an opposite tip of its rail segment, and inner rail segment 234A-2 includes a first end 1106A-2 at an opposite tip of that rail segment.

In one example, main section 1104A-1 and main section 1104B-2 correspond to representative portion 900 in FIG. 9 with a length (parallel to the X axis in FIG. 11A) of roughly 39 feet and a width across rail body 902 (parallel to the Y axis in FIG. 11A) of about 90 mm. First end 1106A-1 and second end 1108A-2, as shown, are regions of reduced width along each end of the rail segments. In one example, first end 1106A-1 and second end 1108A-2 are about 14.5 inches in length from the tip of the respective rail segment and generally half the width of main section 1104A-1 and main section 1104A-2, i.e. about 45 mm. These dimensions are representative only and other values may be chosen without departing from the principles of the present disclosure. First end 1106A-1 and second end 1108A-2 may be manufactured as shown, formed by dividing a single rail segment, or formed by removing sections from main section 1104A-1 and main section 1104A-2, among other options. In some examples, as depicted in FIG. 11A, first end 1106A-1 and second end 1108A-2 are symmetrical and include first face 1110A-1 and second face 1112A-2, respectively. First face 1110A-1 and second face 1112A-2 at least in part run longitudinally through each rail segment, i.e., generally parallel to outer sides of the respective rail segment, such as first outer side 1114A-1 and second outer side 1116A-1 for inner rail segment 234A-1.

FIG. 11A depicts a main section 1104-1A on inner rail segment 234A-1 and a first end 1106A-2 on inner rail segment 234A-2 being joined within inner fishplate 1102A. Inner fishplate 1102A is divided into a first longitudinal half 1118A and a second longitudinal half 1120A. A structurally resilient material such as steel, inner fishplate 1102A has an inner fishplate base 1122A along a bottom where first longitudinal half 1118A and second longitudinal half 1120A meet and a first edge 1124A and a second edge 1126A at opposite longitudinal ends. Resembling a lipped channel in some examples, inner fishplate 1102A has a first lip 1128A and a second lip 1130A defining a fishplate groove 1132A that extends along the length of inner fishplate 1102A. One or more attachment devices, such as first bolt 1134A extends between first longitudinal half 1118A and second longitudinal half 1120A through inner fishplate base 1122A. Engaging first bolt 1134A helps draw first longitudinal half 1118A and first lip 1128A against second longitudinal half 1120A and second lip 1130A in a pinching action.

FIG. 11B shows the cross-section of single rail joint 1100. As discussed above, a connector such as first bolt 1134A or similar device pulls first lip 1128A of first longitudinal half 1118A and second lip 1130A of second longitudinal half 1120A toward each other. Passing beneath inner rail segment 234A-1, first bolt 1134A thereby urges first lip 1128A against rail web 904A-1 and second lip 1130A against rail web 904A-2. Rail bottom 910A-1 and rail bottom 910A-2 rest on inner fishplate base 1122A, while first face 1110A-1 abuts second face 1112A-2. As well, upper plate 912A-1 and upper plate 912A-2 also abut and form a generally combined surface at the top of single rail joint 1100 for contactor 118.

In an assembly step, first longitudinal half 1118A is positioned along first end 1106A-1 so first lip 1128A fits within first rail groove 918 and rail web 904 and lower flange 906 fit within fishplate groove 1132A. Similarly, second longitudinal half 1120A is positioned along second end 1108A-2 so second lip 1130A fits within second rail groove 920. Tightening of first bolt 1134A draws first longitudinal half 1118A and second longitudinal half 1120A together, pinching first face 1110A-1 against second face 1112A-2. Accordingly, a single rail joint 1100 or splice between inner rail segment 234A-1 and inner rail segment 234A-2 is accomplished while maintaining lateral overlap across upper plate 912A-1 along first end 1106A-1 and second end 1108A-2 where first face 1110A-1 and second face 1112A-2 engage. The overlapping portions of the rails permit slippage longitudinally (parallel to the X axis) between inner rail segment 234A-1 and inner rail segment 234A-2 in adjusting the length of power rail 108 during installation, while ensuring electrical conductivity between 234A-1 and 234A-2.

The split structure of inner fishplate 1102A can additionally accommodate bends in rail segments 240 that are brought together within single rail joint 1100. FIG. 12 illustrates this feature with a collective rail joint 1200 as a group of six rail segments 240 being connected through three fishplates. At the right side of FIG. 12, inner rail segment 234A-1, middle rail segment 234B-1, and outer rail segment 234C-1 are provided from rail support module 200-1, which may be installed at first location 602 (FIG. 6), for instance. First end 1106A-1, first end 1106B-1, and first end 1106C-1 extend beyond rail support module 200-1 at first location 602, such as to a position in about the middle of second location 604. At the left side of FIG. 12, inner rail segment 234A-2, middle rail segment 234B-2, and outer rail segment 234C-2 are provided from rail support module 200-2, which may be installed at third location 606, for instance. Second end 1108A-2, second end 1108B-2, and second end 1108C-2 extend beyond rail support module 200-2 to the position in about the middle of second location 604 (FIG. 6) for connection with the rail segments from rail support module 200-1. Shown in a state just prior to final tightening, inner fishplate 1102A, middle fishplate 1102B, and outer fishplate 1102C combine and pull together first end 1106A-1 and second end 1108A-2, first end 1106B-1 and second end 1108B-2, and first end 1106C-1 and second end 1108C-2 in the same manner as discussed above for the inner rail in FIG. 11A.

The rail segments in the example of FIG. 12 are installed within a curve in haul route 101 of about 20 degrees per 40 feet. The curve bends in the X-Y plane in FIG. 12 with the ends of the rail segments bending in the direction of the −Y axis. This curvature would correspond, for example, to a right turn within haul route 101 of 20 degrees, with inner rail segment 234A being at an inner position of the curve and outer rail segment 234C being at an outer position of the curve. With each of the rail segments being pre-bent at about 10 degrees per 40 feet, the rail segments in FIG. 12 would be bent an additional 10 degrees per 40 feet during installation. Typically, this additional bending could be achieved manually, although mechanized assistance for bending is possible. In some examples, the ends of each rail segment, including for instance the first ends 1106 and second ends 1108, may be kept straight to assist with the splicing into single rail joint 1100 and can extend about 20 inches from the tips of the segments.

As shown in FIG. 12, the ability to slide rail segments longitudinally with respect to each other within inner fishplate 1102A, middle fishplate 1102B, and outer fishplate 1102C enables refined positioning within collective rail joint 1200 to accommodate curves in haul route 101. For instance, inner rail segment 234A-1 and inner rail segment 234A-2, at the inner position of the 20 degree curvature, can be slid within fishplate groove 1132A closer together than outer rail segment 234C-1 and outer rail segment 234C-2 within fishplate groove 1132C, which are at the outer position of the 20 degree curvature. This positioning leads to more overlap between first face 1110A-1 and second face 1112A-2 than between second face 1110C-1 and second face 1112C-2. Specifically, as shown in FIG. 12, corresponding to these overlaps, inner longitudinal distance 1202 is longer than middle longitudinal distance 1204, which is longer than outer longitudinal distance 1206, as the rails within collective rail joint 1200 form a 20 degree curvature. Thus, the inside rail, the middle rail, and the outer rail have progressively longer distances within the curvature along haul route 101. While the example of FIG. 12 shows a curvature of 20 degrees per 40 feet, the same principles apply to curvatures of other degrees or directions. For instance, for a joint within a left turn of 10 degrees on haul route 101, the pre-bent rail segments would not need to be bent additionally on installation and would each be placed to curve in the X-Y plane toward the Y axis in FIG. 12. In that situation, outer longitudinal distance 1206 would be longer than middle longitudinal distance 1204, which would be longer than inner longitudinal distance 1202. Accordingly, the configuration of FIGS. 11 and 12 enable the same rails to be adapted for use in any position or curvature along haul route 101 and avoid the need for rail segments of special shape to be used.

A method 1300 for joining rail segments is defined by representative steps consistent with the present disclosure in the flowchart of FIG. 13. For method 1300, as well as other methods described in this disclosure, the steps in which the method is described are not intended to be construed as a limitation. Any number of steps can be combined in any order to implement the disclosed method, can be performed in parallel to implement the processes, and in some embodiments, one or more blocks of the process can be omitted entirely. Moreover, the processes such as 1300 can be combined in whole or in part with other methods. Beginning with a step 1302, rail segments, such as a first narrowed end of a first rail segment and a second narrowed end of a second rail segment of an inner rail, are positioned within a first fishplate. As explained above, first end 1106A-1 and second end 1108A-2 may be arranged within inner fishplate 1102A to be joined. In step 1304, the first narrowed end and the second narrowed end are contacted laterally across a first longitudinal distance within the first fishplate. FIG. 12 illustrates one example where overlapping narrowed ends, such as first end 1106A-1 and second end 1108A-2, are made to contact each other across inner longitudinal distance 1202. Further, in step 1306, at least one first bolt is tightened within the first fishplate and extends beneath at least one of the first rail segment and the second rail segment. The one first bolt may, in some examples, be first bolt 1134A, which extends through inner fishplate base 1122A of inner fishplate 1102A.

Method 1300 continues with step 1308 of positioning other rail segments, such as a third narrowed end of a third rail segment and a fourth narrowed end of a fourth rail segment of an outer rail, within a second fishplate parallel to the first fishplate. For instance, first end 1106C-1 and second end 1108C-2 may be arranged within outer fishplate 1102C to be joined, as shown in FIG. 12. In step 1310, the third narrowed end and the fourth narrowed end are contacted laterally across a second longitudinal distance within the second fishplate, and in step 1312, at least one second bolt is tightened within the second fishplate extending beneath at least one of the third rail segment and the fourth rail segment. First end 1106C-1 and second end 1108C-2 can be placed in contact across outer longitudinal distance 1206, with third bolt 1134C being tightened to pull together second face 1110C-1 and second face 1112C-2.

Those of ordinary skill in the field will appreciate that the principles of this disclosure are not limited to the specific examples discussed or illustrated in the figures. For example, while rail segments 234 have been discussed in terms of I-beam cross-sections, other configurations for the rails is feasible. Moreover, rail segments 234 are discussed as having a standard shape for all portions of power rails 108, rail segments 234 may be customized into other types as needed. Moreover, while the present disclosure addresses power rails 108 as having three conductors, implementations have more or fewer conductors are contemplated. In addition, the principles disclosed are not limited to implementation on a work machine. Any moving vehicle deriving electrical power from a ground-based conductor rail could benefit from the examples and techniques disclosed and claimed.

INDUSTRIAL APPLICABILITY

The present disclosure provides systems and methods for supporting exposed rails at a position elevated above ground. A modular structure supports elevated rail segments for delivering electrical power to a moving work machine, such as a hauler at a mining site. Opposite ends of a roadside barrier contain complementary tubular couplers arranged vertically. A lower end of a dielectric stanchion positioned in one of the tubular couplers has opposing dielectric plates at an upper end. To help ensure safe electrical operation, a top edge of each plate has a creepage concavity between a pair of rail recesses. Another dielectric stanchion of similar configuration is positioned in the other of the tubular couplers. To assist with quick assembly of a modular support structure, holes within the couplers and the stanchions ensure alignment of respective rail recesses in which conductive rails are placed. Dielectric inserts frictionally lock the rails into the rail recesses and provide pliability for the mounted rails and the modular support structure.

As noted above with respect to FIGS. 1-10, a first rail support 220A and a second rail support 220B each with an opposing front plate 226 and rear plate 228 are positioned at opposite ends of an oblong base 204. Each front plate has top edge with rail recesses, such as inner recess 804, middle recess 806, and outer recess 808, that are dimensioned to fit at least lower portions of rail segments 234. The upper portion of rail segments 234 remain exposed above top edge 802 for easy engagement by contactor 118 from work machine 100. A first concavity 814 and a second concavity 816 separate the three rail recesses along top edge 802. Pins securing first rail support 220A and second rail support 220B to barrier assembly 204 confirm alignment of the rail recesses prior to installation of rail segments 234.

In the examples of the present disclosure, first support pole 220A and second support pole 220B on opposite ends of a barrier assembly 204, along with associated front plates 226 and rear plates 228, enable modular installation of rail segments 234 and safe operation of power rails 108 when energized. Support poles 220 permit mounting power rails 108 out of the normal reach of a person or wildlife, while closed coupler 216 and open coupler 218 permit quick attachment and detachment of support poles 220 in setting up or dismantling rail support module 200. On front plates 226 and rear plates 228, rail recesses hold rail segments 234 pliably in place and expose upper plate 912 of the rail segments above the plates for easy access, reducing maneuvering otherwise required from conductor rod 106 on work machine 100. As well, first concavity 814 and second concavity 816 help ensure adequate electrical separation between the conductor rails, increasing electrical safety.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Terms of approximation are meant to include ranges of values that do not change the function or result of the disclosed structure or process. For instance, the term "about" generally refers to a range of numeric values that one of skill in the art would consider equivalent to the recited numeric value or having the same function or result. Similarly, the antecedent "substantially" means largely, but not wholly, the same form, manner or degree, and the particular element will have a range of configurations as a person of ordinary skill in the art would consider as having the same function or result. As an example, "substantially parallel" need not be exactly 180 degrees, but may also encompass slight variations of a few degrees based on the context.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A support structure for conductor rails, comprising:
a dielectric post extending along a longitudinal axis from a lower region to an upper region;
a first dielectric plate having a first top portion disposed substantially perpendicular to the longitudinal axis, and a substantially planar front surface, the first top portion having a first concave surface, a first rail recess, and a second rail recess, the first concave surface being disposed between the first rail recess and the second rail recess; and
a second dielectric plate having a second top portion disposed substantially perpendicular to the longitudinal axis and a substantially planar rear surface, the second top portion having a second concave surface, a third rail recess, and a fourth rail recess, the second concave surface being disposed between the third rail recess and the fourth rail recess, wherein the first dielectric plate and the second dielectric plate are connected to the dielectric post such that the front surface:
is disposed opposite and facing the rear surface, and
is spaced from the rear surface by a first distance.

2. The support structure of claim 1, further comprising one or more buffering sleeves positioned between the first dielectric plate and the second dielectric plate.

3. The support structure of claim 1, wherein the first rail recess and the third rail recess are aligned for receiving a lower portion of a first conductor rail, and the second rail recess and the fourth rail recess are aligned for receiving a lower portion of a second conductor rail.

4. The support structure of claim 3, wherein a substantially vertical height of the first rail recess is less than a substantially vertical height of the first conductor rail extending from a base of the first conductor rail to a top surface of the first conductor rail.

5. The support structure of claim 1, wherein the first rail recess has a plate base, a first sidewall extending substantially perpendicular to the plate base, and a second sidewall extending substantially perpendicular to the plate base, the first sidewall forming a first groove configured to receive a first wedge for securing a first conductor rail, the second sidewall forming a second groove configured to receive a second wedge for securing the first conductor rail.

6. The support structure of claim 1, wherein the distance between the first dielectric plate and the second dielectric plate is greater than or equal to an outer diameter of the dielectric post.

7. The support structure of claim 1, wherein the first dielectric plate includes a fifth rail recess and a third concave surface between the second rail recess and the fifth rail recess, and the second dielectric plate includes a sixth rail recess and a fourth concave surface between the fourth rail recess and the sixth rail recess.

8. An apparatus, comprising:
an oblong base having a first end separated from a second end along a horizontal axis;
a first rail support positioned at the first end of the oblong base along a first substantially vertical axis, the first rail support comprising a first dielectric post and a first dielectric plate, the first dielectric plate having a first top portion with a first concave surface between a first rail recess and a second rail recess;
a second rail support positioned at the second end of the oblong base along a second substantially vertical axis, the second rail support comprising a second dielectric post and a second dielectric plate, the second dielectric plate having a second top portion with a second concave surface between a third rail recess and a fourth rail recess;
a first conductor rail situated within the first rail recess and the third rail recess; and
a second conductor rail situated within the second rail recess and the fourth rail recess.

9. The apparatus of claim 8, wherein the first rail support includes a third dielectric plate positioned on an opposite side of the first dielectric post from, and extending substantially parallel to, the first dielectric plate.

10. The apparatus of claim 8, further comprising shims within the first rail recess of the first dielectric plate configured to secure the first conductor rail within the first rail recess.

11. The apparatus of claim 8, wherein the first dielectric post is secured within a first tubular holder attached to the first end of the oblong base, and the second dielectric post is secured within a second tubular holder attached to the second end of the oblong base.

12. The apparatus of claim 11, wherein the first tubular holder includes a first hole with a first central axis transverse to the first substantially vertical axis, the first dielectric post includes a second hole with a second central axis transverse to the first substantially vertical axis, the second tubular holder includes a third hole with a third central axis transverse to the second substantially vertical axis, and the second dielectric post includes a fourth hole with a fourth central axis transverse to the second substantially vertical axis, wherein colinear alignment of the first axis with the second axis and colinear alignment of the third axis with the fourth axis positions the first rail recess and the third rail recess to receive the first conductor rail.

13. The apparatus of claim 8, wherein the first conductor rail includes a lower flange, a web section, an upper flange, and an upper plate, and wherein the lower flange and the web section are situated adjacent sidewalls of the first rail recess.

14. A method, comprising:
placing a moveable support structure on a ground surface, the moveable support structure having a first end and a second end separated along a horizontal axis by a base;
inserting a lower portion of a first dielectric post into a first holder connected to the first end, the first dielectric post having an upper portion supporting first substantially parallel dielectric plates on opposite sides of the first dielectric post;
inserting a lower portion of a second dielectric post into a second holder connected to the second end, the second dielectric post having an upper portion supporting second substantially parallel dielectric plates on opposite sides of the second dielectric post;

arranging the lower portion of the first dielectric post in the first holder and the lower portion of the second dielectric post in the second holder to position a first pair of rail recesses on the first parallel dielectric plates and a second pair of rail recesses on the second parallel dielectric plates for receiving a first conductive rail;

securing the lower portion of the first dielectric post to the first holder; and securing the lower portion of the second dielectric post to the second holder.

15. The method of claim 14, wherein the arranging comprises aligning a first slot in the first holder and a first hole in the first dielectric post and aligning a second slot in the second holder and second hole in the second dielectric post.

16. The method of claim 15, further comprising inserting a first pin into the first slot and inserting a second pin into the second slot.

17. The method of claim 14, further comprising lowering the first conductive rail into the first pair of rail recesses and into the second pair of rail recesses.

18. The method of claim 17, further comprising wedging shims between the first conductive rail and the first parallel dielectric plates within the first pair of rail recesses.

19. The method of claim 14, further comprising, prior to inserting the lower portion of the first dielectric post into the first holder:

positioning the first substantially parallel dielectric plates on the opposite sides of the first dielectric post; and inserting a buffering sleeve between facing sides of the first substantially parallel dielectric plates apart from the first dielectric post.

20. The method of claim 19, further comprising securing the first substantially parallel dielectric plates to the first dielectric plate and securing the first substantially parallel dielectric plates to each other via the sleeve.

\* \* \* \* \*